United States Patent
Batistakis et al.

(10) Patent No.: US 11,914,942 B2
(45) Date of Patent: Feb. 27, 2024

(54) METHOD FOR PREDICTING RESIST DEFORMATION

(71) Applicant: ASML NETHERLANDS B.V., Veldhoven (NL)

(72) Inventors: Chrysostomos Batistakis, Eindhoven (NL); Roger Josef Maria Jeurissen, Heel (NL); Koen Gerhardus Winkels, Schijndel (NL)

(73) Assignee: ASML NETHERLANDS B.V., Veldhoven (NL)

( * ) Notice: Subject to any disclaimer, the term of this patent is extended or adjusted under 35 U.S.C. 154(b) by 0 days.

(21) Appl. No.: 18/206,029

(22) Filed: Jun. 5, 2023

(65) Prior Publication Data

US 2023/0334217 A1    Oct. 19, 2023

Related U.S. Application Data

(63) Continuation of application No. 17/416,314, filed as application No. PCT/EP2019/085020 on Dec. 13, 2019, now Pat. No. 11,709,988.

(Continued)

(51) Int. Cl.
*G06F 30/30* (2020.01)
*G06F 30/28* (2020.01)
(Continued)

(52) U.S. Cl.
CPC ............ *G06F 30/398* (2020.01); *G03F 7/705* (2013.01); *G06F 30/28* (2020.01); *G06F 30/3308* (2020.01); *G03F 7/70608* (2013.01); *G03F 7/70625* (2013.01); *G06F 2111/10* (2020.01); *G06F 2119/18* (2020.01)

(58) Field of Classification Search
None
See application file for complete search history.

(56) References Cited

U.S. PATENT DOCUMENTS

| | | | |
|---|---|---|---|
| 5,067,101 A | 11/1991 | Kunikiyo et al. | |
| 6,872,014 B1 | 3/2005 | Paxton et al. | |

(Continued)

FOREIGN PATENT DOCUMENTS

| | | |
|---|---|---|
| CN | 102096315 | 6/2011 |
| CN | 101738851 | 10/2012 |

(Continued)

OTHER PUBLICATIONS

International Search Report issued in corresponding PCT Patent Application No. PCT/EP2019/085020, dated May 25, 2020.

(Continued)

*Primary Examiner* — Leigh M Garbowski
(74) *Attorney, Agent, or Firm* — Pillsbury Winthrop Shaw Pittman, LLP

(57) ABSTRACT

A method for determining a deformation of a resist in a patterning process. The method involves obtaining a resist deformation model of a resist having a pattern, the resist deformation model configured to simulate a fluid flow of the resist due to capillary forces acting on a contour of at least one feature of the pattern; and determining, via the resist deformation model, a deformation of a resist pattern to be developed based on an input pattern to the resist deformation model.

20 Claims, 30 Drawing Sheets

Related U.S. Application Data

(60) Provisional application No. 62/786,637, filed on Dec. 31, 2018.

(51) Int. Cl.
*G03F 7/00* (2006.01)
*G06F 30/398* (2020.01)
*G06F 30/3308* (2020.01)
*G06F 119/18* (2020.01)
*G06F 111/10* (2020.01)

(56) References Cited

U.S. PATENT DOCUMENTS

| | | |
|---|---|---|
| 7,587,704 B2 | 9/2009 | Ye et al. |
| 7,625,678 B2 | 12/2009 | Misaka |
| 8,200,468 B2 | 6/2012 | Ye et al. |
| 8,913,120 B2 | 12/2014 | Poortinga et al. |
| 10,204,197 B2 | 2/2019 | Voznesenskiy et al. |
| 10,423,076 B2 * | 9/2019 | Liu .................... G03F 7/705 |
| 10,901,322 B2 | 1/2021 | Liu |
| 2011/0202892 A1 * | 8/2011 | Lee .................... G03F 1/36 716/53 |
| 2013/0254725 A1 | 9/2013 | Parikh |
| 2014/0362354 A1 | 12/2014 | Nishino et al. |
| 2019/0025705 A1 | 1/2019 | Van Der Laan et al. |
| 2020/0320238 A1 | 10/2020 | Batistakis et al. |

FOREIGN PATENT DOCUMENTS

| | | |
|---|---|---|
| TW | 201141687 | 12/2011 |
| TW | I639894 | 10/2017 |
| WO | 2015095291 | 6/2015 |
| WO | 2016146355 | 9/2016 |
| WO | 2017114662 | 7/2017 |

OTHER PUBLICATIONS

Taiwanese Office Action issued in corresponding Taiwanese Patent Application No. 110115531, dated Nov. 17, 2021.

* cited by examiner

METHOD FOR PREDICTING RESIST DEFORMATION

This application is a continuation of U.S. patent application Ser. No. 17/416,314, filed Jun. 18, 2021, now allowed, which is a U.S. national phase entry of PCT Patent Application No. PCT/EP2019/085020 which was filed Dec. 13, 2019, which claims the benefit of priority of U.S. Patent Application No. 62/786,637 which was filed on Dec. 31, 2018 and which is incorporated herein in its entirety by reference.

TECHNICAL FIELD

The description herein relates to processes involving pattern formation on a substrate, and more particularly to a method of determining resist deformation of a patterned layer on the substrate.

BACKGROUND

A lithographic apparatus can be used, for example, in the manufacture of integrated circuits (ICs) or other devices. In such a case, a patterning device (e.g., a mask) may contain or provide a pattern corresponding to an individual layer of the device ("design layout"), and this pattern can be transferred onto a target portion (e.g. comprising one or more dies) on a substrate (e.g., silicon wafer) that has been coated with a layer of radiation-sensitive material ("resist"), by methods such as irradiating the target portion through the pattern on the patterning device. In general, a single substrate contains a plurality of adjacent target portions to which the pattern is transferred successively by the lithographic apparatus, one target portion at a time. In one type of lithographic apparatus, the pattern on the entire patterning device is transferred onto one target portion in one go; such an apparatus is commonly referred to as a stepper. In an alternative apparatus, commonly referred to as a step-and-scan apparatus, a projection beam scans over the patterning device in a given reference direction (the "scanning" direction) while synchronously moving the substrate parallel or anti-parallel to this reference direction. Different portions of the pattern on the patterning device are transferred to one target portion progressively. Since, in general, the lithographic apparatus will have a magnification factor M (generally <1), the speed F at which the substrate is moved will be a factor M times that at which the projection beam scans the patterning device.

Prior to the device fabrication procedure of transferring the pattern from the patterning device to the substrate of the device manufacturing process, the substrate may undergo various device fabrication procedures of the device manufacturing process, such as priming, resist coating and a soft bake. After pattern transfer, the substrate may be subjected to other device fabrication procedures of the device manufacturing process, such as a post-exposure bake (PEB), development, a hard bake and measurement/inspection of the transferred pattern. This array of device fabrication procedures is used as a basis to make an individual layer of a device, e.g., an IC. The substrate may then undergo various device fabrication procedures of the device manufacturing process such as etching, ion-implantation (doping), metallization, oxidation, chemo-mechanical polishing, metrology (e.g., using a scanning electronic microscope (SEM)), etc., all intended to finish off the individual layer of the device. If several layers are required in the device, then the whole process, or a variant thereof, is repeated for each layer.

Eventually, a device will be present in each target portion on the substrate. If there is a plurality of devices, these devices are then separated from one another by a technique such as dicing or sawing, whence the individual devices can be mounted on a carrier, connected to pins, etc.

So, manufacturing devices, such as semiconductor devices, typically involves processing a substrate (e.g., a semiconductor wafer) using a number of fabrication processes to form various features and multiple layers of the devices. Such layers and features are typically manufactured and processed using, e.g., deposition, lithography, etch, chemical-mechanical polishing, and ion implantation. Multiple devices may be fabricated on a plurality of dies on a substrate and then separated into individual devices. This device manufacturing process may be considered a patterning process. A patterning process involves a patterning step, such as optical or nanoimprint lithography using a lithographic apparatus, to provide a pattern on a substrate and typically, but optionally, involves one or more related pattern processing steps, such as resist development by a development apparatus, baking of the substrate using a bake tool, etching using the pattern using an etch apparatus, etc. Further, one or more metrology processes are typically involved in the patterning process.

As semiconductor manufacturing processes continue to advance, the dimensions of functional elements have continually been reduced while the amount of functional elements, such as transistors, per device has been steadily increasing over decades, following a trend commonly referred to as "Moore's law". At the current state of technology, layers of devices are manufactured using lithographic projection apparatuses that project a pattern corresponding to a design layout onto a substrate using illumination from a deep-ultraviolet illumination source, creating individual functional elements having dimensions well below 100 nm, i.e. less than half the wavelength of the radiation from the illumination source (e.g., a 193 nm illumination source). This process in which features with dimensions smaller than the classical resolution limit of a lithographic projection apparatus are printed, is commonly known as low-$k_1$ lithography, according to the resolution formula $CD=k_1 \times \lambda/NA$, where $\lambda$ is the wavelength of radiation employed (currently in most cases 248 nm or 193 nm), NA is the numerical aperture of projection optics in the lithographic projection apparatus, CD is the "critical dimension"—generally the smallest feature size printed—and $k_1$ is an empirical resolution factor. In general, the smaller $k_1$ the more difficult it becomes to reproduce a pattern on the substrate that resembles the shape and dimensions planned by a circuit designer in order to achieve particular electrical functionality and performance. To overcome these difficulties, sophisticated fine-tuning steps are applied to the lithographic projection apparatus and/or a pattern corresponding to a design layout. These include, for example, but not limited to, optimization of NA and/or optical coherence settings, customized illumination schemes, use of phase shifting patterning devices, optical proximity correction (OPC) in the pattern corresponding to the design layout (such as biasing of pattern feature, addition of an assist feature, applying a serif to a pattern feature, etc.), or other methods generally defined as "resolution enhancement techniques" (RET).

BRIEF SUMMARY

In an embodiment, there is provided a method for determining a deformation of a resist in a patterning process. The method includes obtaining a resist deformation model of a resist having a pattern, the resist deformation model configured to simulate a fluid flow of the resist due to capillary forces acting on a contour of at least one feature of the pattern, and determining, via a processor and the resist deformation model, a deformation of a resist pattern to be developed based on an input pattern to the resist deformation model. The resist deformation model is based on a linearized Navier-Stokes flow equations. The fluid flow is characterized by a Stokes flow, and/or a Hele-Shaw flow.

Furthermore, in an embodiment, there is provided in a method for determining a parameter of a patterning process. The method includes obtaining (i) a patterning process model that includes a resist deformation model of a resist having a pattern, the resist deformation model configured to simulate a fluid flow of the resist due to capillary forces acting on a contour of at least one feature of the pattern, and (ii) a target pattern; determining, via a processor, a resist pattern based on a simulation of the patterning process model with the target pattern as an input to the patterning process model, wherein a difference exists between the resist pattern and the target pattern; and determining, via the processor, a value of a parameter of the patterning process based on the simulation of the patterning process, the value of the parameter being determined such that the difference between the resist pattern and the target pattern is reduced. In an embodiment, the parameter of the patterning process comprises at least one of dose, focus, and optical proximity correction. The method further includes applying the value of the parameter of the patterning process to a lithographic apparatus during the patterning process.

Furthermore, in an embodiment, there is provided in a method for determining a deformation of a pattern to be formed in a patterning process. The method includes inputting, into a resist deformation model (e.g., a thin-film based model), pattern information relating to the pattern to be formed, the model configured to simulate deformation of a portion of a resist, the portion comprising a boundary liquid layer located at a boundary between a developed region in the resist and a region of the resist surrounding the developed region, wherein the model is configured to determine a first deformation component of the boundary liquid layer caused by fluid flow of the boundary liquid layer and a second deformation component of the boundary liquid layer caused by the fluid flow of the boundary liquid layer, and determining, via a processor, the deformation of the pattern to be formed in the resist based on the input pattern information, wherein the deformation comprises a combination of the first deformation component and the second deformation component of the boundary liquid layer. The boundary liquid layer has a thickness smaller than a length of the developed region in the resist at the boundary.

In an embodiment, the first deformation component is determined in a horizontal plane based on a horizontal component of a flow rate of the boundary liquid layer and the second deformation is determined in the horizontal plane based on a vertical component of the flow rate of the boundary liquid layer.

Furthermore, there is provided a method for determining a deformation of a pattern to be formed in a patterning process. The method includes inputting, into a resist deformation model, pattern information relating to the pattern to be formed, the model configured to simulate deformation of a portion of a resist, the portion comprising a boundary liquid layer located at a boundary between a developed region in the resist and a region of the resist surrounding the developed region, wherein the model is configured to determine a deformation of the boundary liquid layer caused by a horizontal fluid flow of the boundary liquid layer; and determining, via a processor, the deformation of the pattern to be formed in the resist by simulating the resist deformation model based on the input pattern information. The boundary liquid layer has a thickness smaller than a length of the developed region in the resist at the boundary.

Furthermore, there is provided a non-transitory computer program product comprising machine-readable instructions for causing a processor to cause performance of the steps of the aforementioned method.

BRIEF DESCRIPTION OF THE DRAWINGS

The accompanying drawings, which are incorporated in and constitute a part of the specification, illustrate one or more embodiments and, together with the description, explain these embodiments. Embodiments of the invention will now be described, by way of example only, with reference to the accompanying schematic drawings in which corresponding reference symbols indicate corresponding parts, and in which.

DETAILED DESCRIPTION

Figure 1:
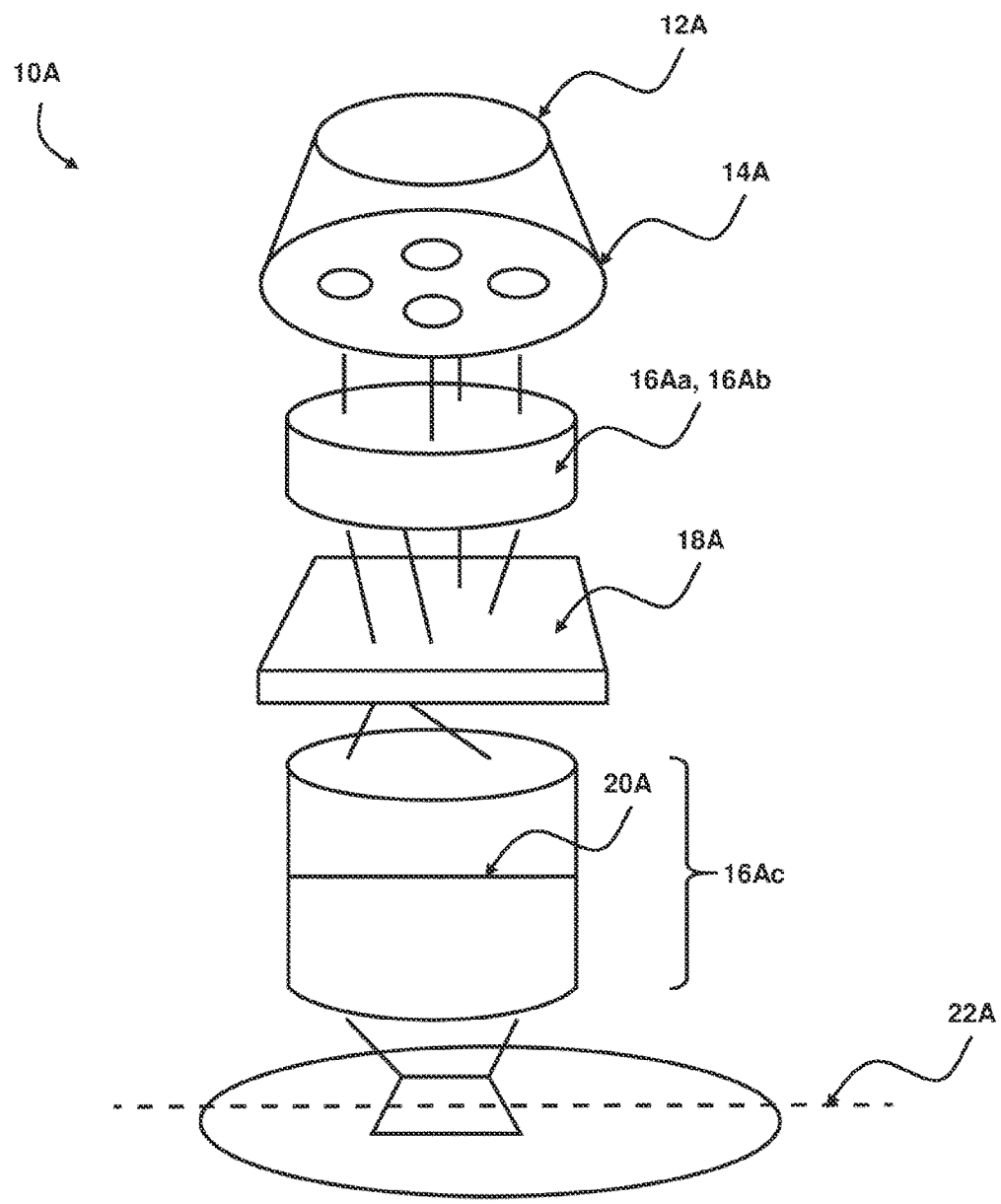
FIG. 1 is a block diagram of various subsystems of a lithography system, according to an embodiment.

As background to embodiments and turning to FIG. 1, there is illustrated an exemplary lithographic projection apparatus 10A. Major components are a radiation source 12A, which may be a deep-ultraviolet excimer laser source or other type of source including an extreme ultra violet (EUV) source, illumination optics which define the partial coherence (denoted as sigma) and which may include optics 14A, 16Aa and 16Ab that shape radiation from the source 12A; a support configured to hold a patterning device 18A; and projection optics 16Ac that project an image of the patterning device pattern onto a substrate plane 22A. An adjustable filter or aperture at the pupil plane of the projection optics may restrict the range of beam angles that impinge on the substrate plane 22A, where the largest possible angle defines the numerical aperture of the projection optics NA=sin($\theta_{max}$). In an embodiment, the lithographic projection apparatus itself need not have the radiation source 12A.

So, in a lithographic projection apparatus, the optics 16Ac directs an aerial image of the patterning device pattern onto the substrate (typically a de-magnified version). An aerial image (AI) is the radiation intensity distribution at substrate level. A resist layer on the substrate is exposed and the aerial image is transferred to the resist layer as a latent "resist image" (RI) therein. The resist image (RI) can be defined as a spatial distribution of solubility of the resist in the resist layer.

Now, it is often desirable to be able computationally determine how a patterning process would produce a desired pattern on a substrate. Thus, a simulation can be provided to simulate one or more parts of the process. For example, it is desirable to be able to simulate the lithography process of transferring the patterning device pattern onto a resist layer of a substrate as well as the yielded pattern in that resist layer after development of the resist.

Figure 2:
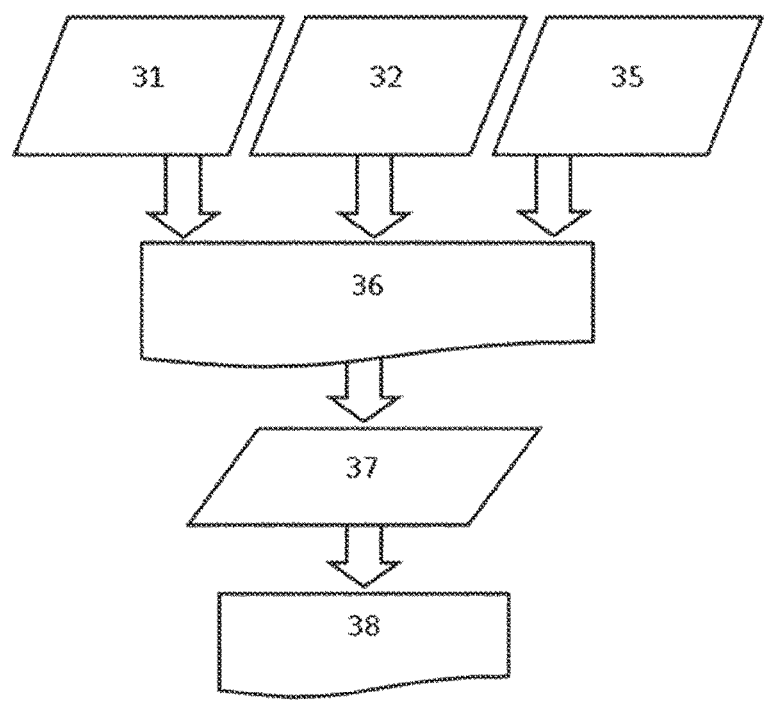
FIG. 2 is a block diagram of simulation models of a computational lithography technique, according to an embodiment.

An exemplary flow chart for simulating lithography in a lithographic projection apparatus is illustrated in FIG. 2. An illumination model 31 represents optical characteristics (including radiation intensity distribution and/or phase distribution) of the illumination. A projection optics model 32 represents optical characteristics (including changes to the radiation intensity distribution and/or the phase distribution caused by the projection optics) of the projection optics. A design layout model 35 represents optical characteristics (including changes to the radiation intensity distribution and/or the phase distribution caused by a given design layout) of a design layout, which is the representation of an arrangement of features on or formed by a patterning device. An aerial image 36 can be simulated using the illumination model 31, the projection optics model 32 and the design layout model 35. A resist image 38 can be simulated from the aerial image 36 using a resist model 37. Simulation of lithography can, for example, predict contours and/or CDs in the resist image.

More specifically, it is noted that the illumination model 31 can represent the optical characteristics of the illumination that include, but not limited to, NA-sigma ($\sigma$) settings as well as any particular illumination shape (e.g. off-axis illumination such as annular, quadrupole, dipole, etc.). The projection optics model 32 can represent the optical characteristics of the of the projection optics, include, for example, aberration, distortion, a refractive index, a physical size or dimension, etc. The design layout model 35 can also represent one or more physical properties of a physical patterning device, as described, for example, in U.S. Pat. No. 7,587,704, which is incorporated by reference in its entirety. Optical properties associated with the lithographic projection apparatus (e.g., properties of the illumination, the patterning device and the projection optics) dictate the aerial image. Since the patterning device used in the lithographic projection apparatus can be changed, it is desirable to separate the optical properties of the patterning device from the optical properties of the rest of the lithographic projection apparatus including at least the illumination and the projection optics, and hence design layout model 35.

The resist model 37 can be used to calculate the resist image from the aerial image, an example of which can be found in U.S. Pat. No. 8,200,468, which is hereby incorporated by reference in its entirety. The resist model is typically related only to properties of the resist layer (e.g., effects of chemical processes which occur during exposure, post-exposure bake and/or development).

The objective of the simulation is to accurately predict, for example, edge placements, aerial image intensity slopes and/or CDs, which can then be compared against an intended design. The intended design is generally defined as a pre-OPC design layout which can be provided in a standardized digital file format such as GDSII, OASIS or other file format.

From the design layout, one or more portions may be identified, which are referred to as "clips". In an embodiment, a set of clips is extracted, which represents the complicated patterns in the design layout (typically about 50 to 1000 clips, although any number of clips may be used). As will be appreciated by those skilled in the art, these patterns or clips represent small portions (e.g., circuits, cells, etc.) of the design and especially the clips represent small portions for which particular attention and/or verification is needed. In other words, clips may be the portions of the design layout or may be similar or have a similar behavior of portions of the design layout where critical features are identified either by experience (including clips provided by a customer), by trial and error, or by running a full-chip simulation. Clips often contain one or more test patterns or gauge patterns. An initial larger set of clips may be provided a priori by a customer based on known critical feature areas in a design layout which require particular image optimization. Alternatively, in another embodiment, the initial larger set of clips may be extracted from the entire design layout by using some kind of automated (such as, machine vision) or manual algorithm that identifies the critical feature areas.

In some examples, the simulation and modeling can be used to configure one or more features of the patterning device pattern (e.g., performing optical proximity correction), one or more features of the illumination (e.g., changing one or more characteristics of a spatial/angular intensity distribution of the illumination, such as change a shape), and/or one or more features of the projection optics (e.g., numerical aperture, etc.). Such configuration can be generally referred to as, respectively, mask optimization, source optimization and projection optimization. Such optimizations can be performed on their own or combined in different combinations. One such example is source-mask optimization (SMO) involves the configuring of one or more features of the patterning device pattern together with one or more features of the illumination. The optimization techniques may focus on one or more of the clips. The optimizations may use the simulations described herein to produce values of various parameters.

In an optimization process of a system, a figure of merit of the system can be represented as a cost function. The optimization process boils down to a process of finding a set of parameters (design variables) of the system that minimizes the cost function. The cost function can have any suitable form depending on the goal of the optimization. For example, the cost function can be weighted root mean square (RMS) of deviations of certain characteristics (evaluation points) of the system with respect to the intended values (e.g., ideal values) of these characteristics; the cost function can also be the maximum of these deviations (i.e., worst deviation). The term "evaluation points" herein should be interpreted broadly to include any characteristics of the system. The design variables of the system can be confined to finite ranges and/or be interdependent due to practicalities of implementations of the system. In case of a lithographic projection apparatus, the constraints are often associated with physical properties and characteristics of the hardware such as tunable ranges, and/or patterning device manufacturability design rules, and the evaluation points can include physical points on a resist image on a substrate, as well as non-physical characteristics such as dose and focus.

As noted above, a layer on a substrate can have pattern transferred thereto. Such a layer will be generally referred to as a resist layer and may have various chemical compositions. In an embodiment, the resist layer is a layer of radiation-sensitive material. The resist layer usually has a small but finite thickness that may be comparable in size to patterns imaged onto the resist. The resist layer may undergo various treatments in a lithographic process. For example, the resist may be exposed to radiation such as EUV or DUV, which induces chemical reactions in the resist. The resist may undergo a post-exposure bake (PEB), development (e.g., positive tone development or negative tone development), and/or a hard bake. Each of these treatments may cause the resist to deform in one, two or three dimensions and the deformation may be location dependent (e.g., three-dimensional location dependent). The deformation of the resist may affect downstream treatments such as material deposition and etching. In a lithographic process using negative tone development, the impact of the resist deformation on resist top loss and critical dimension may be especially significant. Therefore, a resist model 37 with the ability to predict deformation of the resist is beneficial to more accurate lithography and higher yield. The resist model 37 may also be able to predict the reaction of the resist layer to various other physical and chemical treatments in the lithographic process. An exemplary resist model according to an aspect of the present disclosure is described later.

A pattern is formed in the resist layer, e.g., by exposing the resist layer to radiation via a patterning device. The resist layer may undergo post-exposure treatments such as PEB and deform into a deformed resist layer with deformed pattern therein. In an embodiment, a portion of the deformed resist layer that received sufficiently high dose during the exposure remain on the substrate after negative tone development and the rest (e.g., portions) of the deformed resist layer is dissolved after negative tone development. Alternatively, the portion of the deformed resist layer received sufficiently high dose during the exposure to dissolve during positive tone development and the rest of the deformed resist layer remains on the substrate after positive tone development. Whether the portion remains or dissolves depends on the chemical composition of the resist and the chemical composition of the developer.

As noted above, simulation models attempt to accurately predict patterns in a resist profile. The resist is a viscoelastic material and, for a period of time, the resist may exhibit a fluidic behavior that is significant. Under this assumption, intermolecular forces, pressure and/or other forces (generally referred to herein as intrafluid forces) can result in a stress in the fluid that yields a viscous flow. Simulation models fail to account for such a viscous flow within the resist. Moreover, the effects of intrafluid forces acting on the resist tend to be significant when the resist pattern is dense. So, simulation models are not able to predict, with high accuracy, shapes of a resist pattern (particularly dense patterns or patterns with high curvature) in resist, which can lead to downstream effects such as modeling errors.

The resist pattern includes a plurality of developed portions that are surrounded by resist. One or more intrafluid forces, (e.g., surface tension) typically act on the resist thereby deforming the resist at the boundaries of the developed portions of the resist. Thus, a shape of a resist pattern, corresponding to a developed portion, deforms at several locations along the boundary of the developed portion. In an embodiment, a resist deformation model is developed under the assumption that capillary and viscous flow effects are dominant. Furthermore, the resist deformation model is developed under the assumption that continuum description holds. In an embodiment, the driving force acting on the resist is a capillary force that acts at an interface between two materials such as the resist and an inner portion (e.g., air) of the developed portion, e.g., as discussed with respect to contours in image 320 of FIG. 3C below. In an embodiment, the contour is obtained via lithographic simulations and contour extraction algorithms known to a person skilled in the art.

In an embodiment, a mask pattern layout of a pattern to be printed on the wafer is obtained. From the mask pattern layout, an aerial image (e.g., in FIG. 3B) is generated, for example, via lithographic simulation software such as Tachyon, HyperLith, or ProLith or other software configured to generate an aerial image from the mask pattern layout. In a typical situation, the aerial image is a grayscale image, wherein each pixel of the image corresponds to a different radiation intensity (i.e., before the radiation impinges on the resist). An example of an aerial image (e.g., 310) and corresponding pattern (e.g., 300) printed on a wafer is illustrated in FIGS. 3B and 3A, respectively.

Figure 3A:
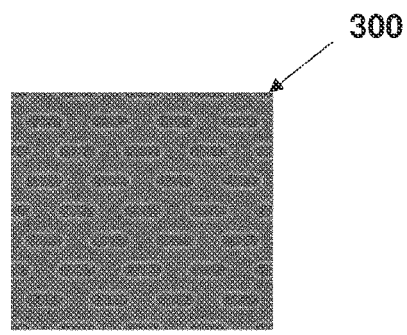
FIG. 3A illustrates a wafer image of a pattern having a plurality of features (e.g., bars) printed on the wafer, according to an embodiment.

FIG. 3A illustrates a wafer image 300 of a pattern having a plurality of features (e.g., bars) printed on the wafer. It can be seen that contours of the features are deformed due to deformation of the resist on the wafer. It is beneficial to predict deformation of such features of the pattern in the resist to adjust or control parameters of the patterning process so that desired patterns are printed without defects, thereby increasing yield of the patterning process. In an embodiment, such deformation in the resist is predicted based on the resist deformation model (e.g., a fluid dynamics model) discussed in the present disclosure below, e.g., with respect to FIG. 4A and FIG. 5.

Figure 3B:
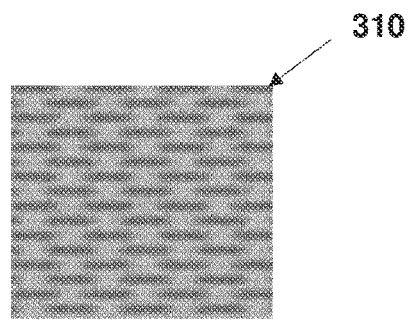
FIG. 3B is the aerial image of the pattern printed on the wafer in FIG. 3A, according to an embodiment.

FIG. 3B is the aerial image 310 of the pattern printed on the wafer (in FIG. 3A). In an embodiment, the aerial image 310 is a grayscale image and each pixel corresponds to a different light intensity (before the light hits the resist). From the aerial image 310, contours of the pattern can be extracted at some threshold level. For example, extracting contours of the aerial image at an intensity value breaching a desired threshold.

Figure 3C:
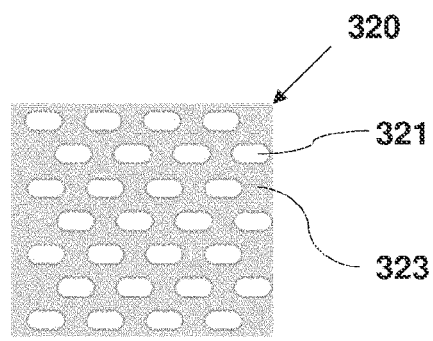
FIG. 3C illustrates an example of contours obtained from the aerial image of FIG. 3B, according to an embodiment.

FIG. 3C illustrates an example of an image 320 including contours in a resist 323 (also referred as resist contours) obtained from the aerial image 310 that can be input to the deformation model of the present disclosure to determine deformation of the resist. In an embodiment, the image 320 including the contours is a binary image. The image 320 includes a plurality of contours of features (e.g., bars, contact hole, etc.) of a pattern surrounded by resist. A binary image represents the outline of the each of the features of the pattern.

In an embodiment, in the contours 320, everything inside the extracted contours is gas 321 (white area) and outside these contours is the resist 323 (grey area). Then, both the resist 323 and the gas 321 can be simulated as different or the same fluids to determine the deformation of the contours. When using Stokeslet or Hele-Shaw flow, the fluids 323 and 321 are considered to have the same viscosity. In an embodiment, the simulation is based on a 2D resist deformation model, where a resist height or thickness is not taken into account. However, the present disclosure is not limited to 2D model, and can be modified to apply to a 3D resist as well. An example of a resist deformation process is explained with respect to FIG. 4A.

Figure 4A:
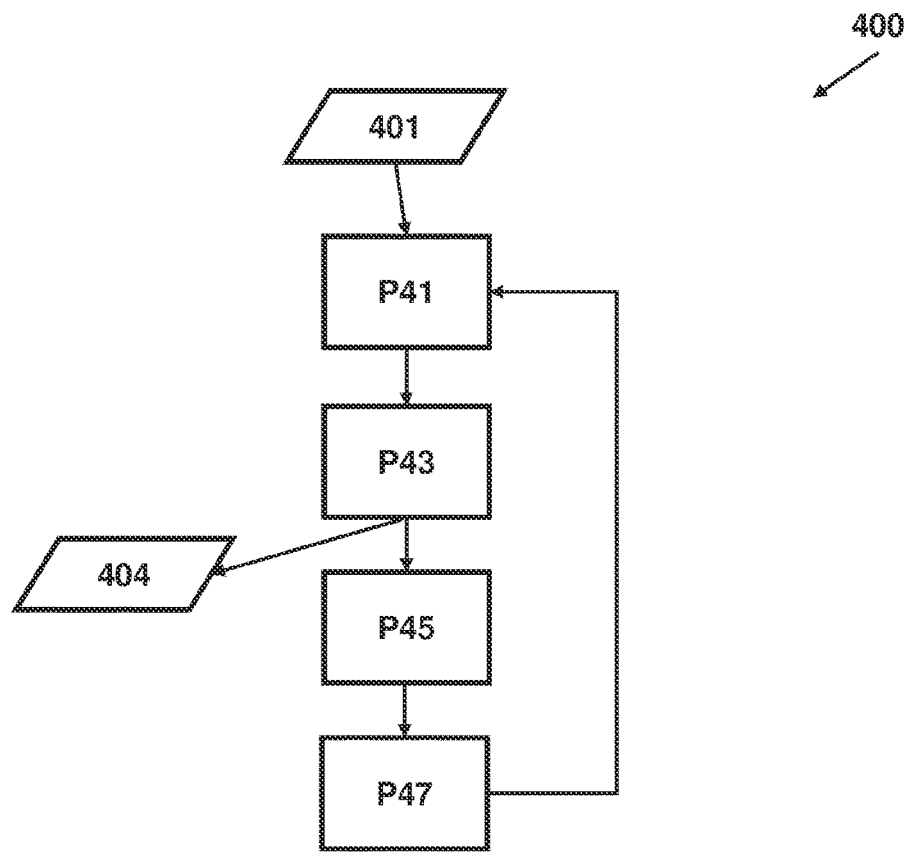
FIG. 4A is an example flowchart for obtaining a resist deformation using a resist deformation model, according to an embodiment.

FIG. 4A is an example flowchart for obtaining a resist deformation using a resist deformation model, where the resist deformation model is a fluid dynamics model based on Navier-Stokes equations that capture a viscous flow in the resist arising from one or more intrafluid forces and computes a corresponding deformation of the resist. So, the fluid dynamics model is able to accurately predict, e.g., complex shapes of the resist pattern. In an embodiment, the fluid dynamics model is linearized, for example, Stokes flow (e.g., a 2D Stokes flow) represented by a linearized Navier-Stokes equation.

In an embodiment, obtaining resist deformation involves simulation of the fluid dynamics model using an image comprising a contour(s) of a feature(s) as input. In an embodiment, the contours are extracted (e.g., in 320) from an aerial image (e.g., in 310) as discussed with respect to FIGS. 3B and 3C above. The extracted contours can be a grey scale image or a binary image. In an embodiment, the extracted contour refers to points where the force due to surface tension will be applied.

On the extracted contours, forces (also referred to as capillary forces) at different location along the contours are determined resulting in a force field. The forces or force field along the contours cause deformation of the features. In an embodiment, forces acting on other features may cause deformation of the desired feature. The forces are further used to determine a velocity field (or flow field) at and around the contours of the features of the resist. In an embodiment, the velocity field mimics the movement of the edges of the contours over time that eventually results in a final deformation of the contour of the feature in the resist.

Figure 4B:
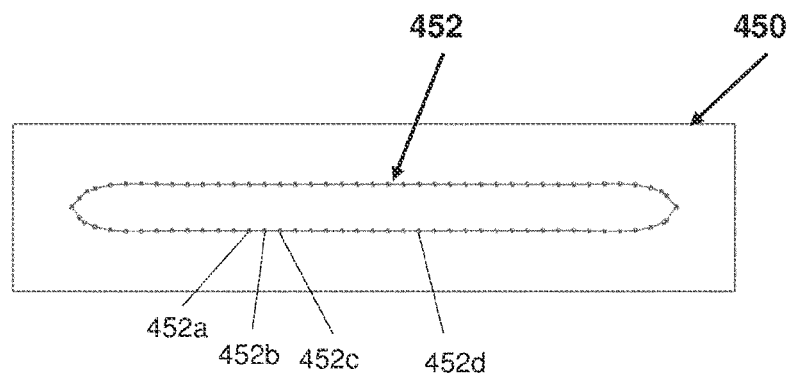
FIG. 4B illustrates an example feature within a resist domain, according to an embodiment.

In an embodiment, the simulation is an iterative process. In an iteration, a first step P41 involves determining a force ($F_i$) at a location (i) along the desired contour. In an embodiment, the force is calculated for the location (i) along the desired contour (e.g., as illustrated in FIG. 4B) based on the forces at neighboring locations (j), where j is different from i. Such force ($F_i$) is calculated for each location along the contour based on other locations along the contour. In an embodiment, the location (i) and/or (j) is represented by a vertex or a point. The equation and approach used to determine a force is explained later in the disclosure (e.g., equations 3-5). In an embodiment, the force may be calculated using Stokes' equation, which is a linearized version of a Navier-Stokes equation obtained by neglecting inertial terms, as given below (equation 1).

$$-\nabla P + \mu \nabla^2 \vec{u} + \vec{F} = 0 \qquad (1)$$

In equation 1, the pressure P is such that the divergence of the velocity field vanishes in the resist domain. The velocity $\vec{u}$ is thus completely determined by the force $\vec{F}$ on the liquid. This equation is linear. Thus, the flow field (interchangeably referred as velocity or velocity flow field) is a convolution of a response to a point force, and the applied forces. In an embodiment, velocity field is driven by capillary forces determined using equation (3-5), discussed later.

Once the forces at each location along the contour is determined, a second step P43 involves determining a total velocity field (u) by the force ($F_i$) at all other points than point i. In an embodiment, the velocity field at a point j is determined by evaluating equation $u_j = \Sigma G_{ij} \cdot F_i \forall i,j$+regularization, where $G_{jj}$=0 (Einstein's summation convention is used in notation herein). In an embodiment, the fluid dynamic model may require regularization, as solving for velocity field using the fluid dynamics model may be an ill-posed problem that may result in unstable simulation (e.g., due to singularity that may occur at a vertex or a point along the contour). Thus, regularization may provide a stability in simulation. In an embodiment, the regularization may be done to solve problem such as the singular behavior of the Stokeslet. Such singular behavior disappears when the applied force is distributed over a line segment, instead of being applied at a single point, which is equivalent to applying a pair of rotlets of equal magnitude and opposite sign at the ends of the line segment (e.g., see FIG. 4E).

According to an embodiment, a velocity response $G_{ij}(x-\tilde{x})$ at position x to a point force at position $\tilde{x}$ is called a Stokeslet, given by equation (2) below:

$$G_{ij}(x) = -\delta_{ij}ln(\sqrt{x_k x_k}) + \frac{x_i x_j}{x_k x_k} \quad (2)$$

In an embodiment, the flow may be a 2D Stokes flow and G (in aforementioned equation) represents Green's function. The equation and approach (e.g., using Stokeslets and boundary conditions) used to determine a velocity is explained later in the disclosure. In an embodiment, boundary conditions on the resist or resist domain may be implemented in different ways, for example, as illustrated in FIGS. 4D-4F and explained in detail later in the present disclosure. These boundary conditions are applied to the resist domain, which enable determination of the resist deformation, when the equations such as 1 and 2 are simulated.

In an embodiment, the iteration involves a third step P45, where a velocity at point i is be determined. In an embodiment, the velocity at point i is determined by the equation $\Sigma(r_i) n_i \cdot u_i = 0$, where r is the distance between the neighboring points, $x_{i-1}$ and $x_{i+1}$, of point i, n is the normal vector, and u, is a velocity at point i. In an embodiment, this step is applied to conserve the surface area of the desired polygon or any other polygon for that matter.

Further, the first P41, second P43 and/or the third P45 steps are repeated and the velocity fields at all locations along the contour and corrections corresponding to each such location are superimposed to determine a total velocity field at time step $t_n$. Further, in step P47, a position differential may be equated to a velocity to determine a final deformation. For example, a differential equation $$\frac{dx_i}{dt} = u_i$$

may be solved for position $x_i$ to determine a final deformation of the desired feature or resist in general. For example, the differential equation may be solved using an ODE solving methods such as Euler explicit method which would require small time steps to obtain accurate solutions or use higher order Runge-Kutta methods.

An example of the process for determining resist deformation and related conditions enabling simulation of the resist deformation model is explained for a desired feature 452 with respect to FIGS. 4B-4F.

FIG. 4B illustrates an example feature 452 within a resist domain 450. The feature 452 is interchangeably referred to as a contour 452. As mentioned earlier, the contour 452 may be extracted from a corresponding aerial image. In an embodiment, the contour 452 is divided into vertices or points such as 452a, 452b, 452c, 452d, and so on representing a set of locations within the resist domain 450. Such vertices or points (e.g., 452a-452d) may be arranged or distributed along the contour 452 such that the area within the contour 452 is conserved. Forces and velocities at such vertices are further computed.

Figure 4C:
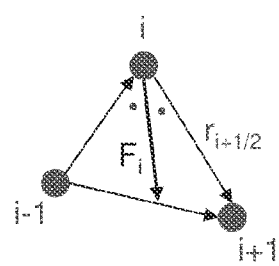
FIG. 4C, a force Fi at a vertex i determined based on neighboring vertices i−1 and 1+1, respectively, according to an embodiment.
Figure 4D:
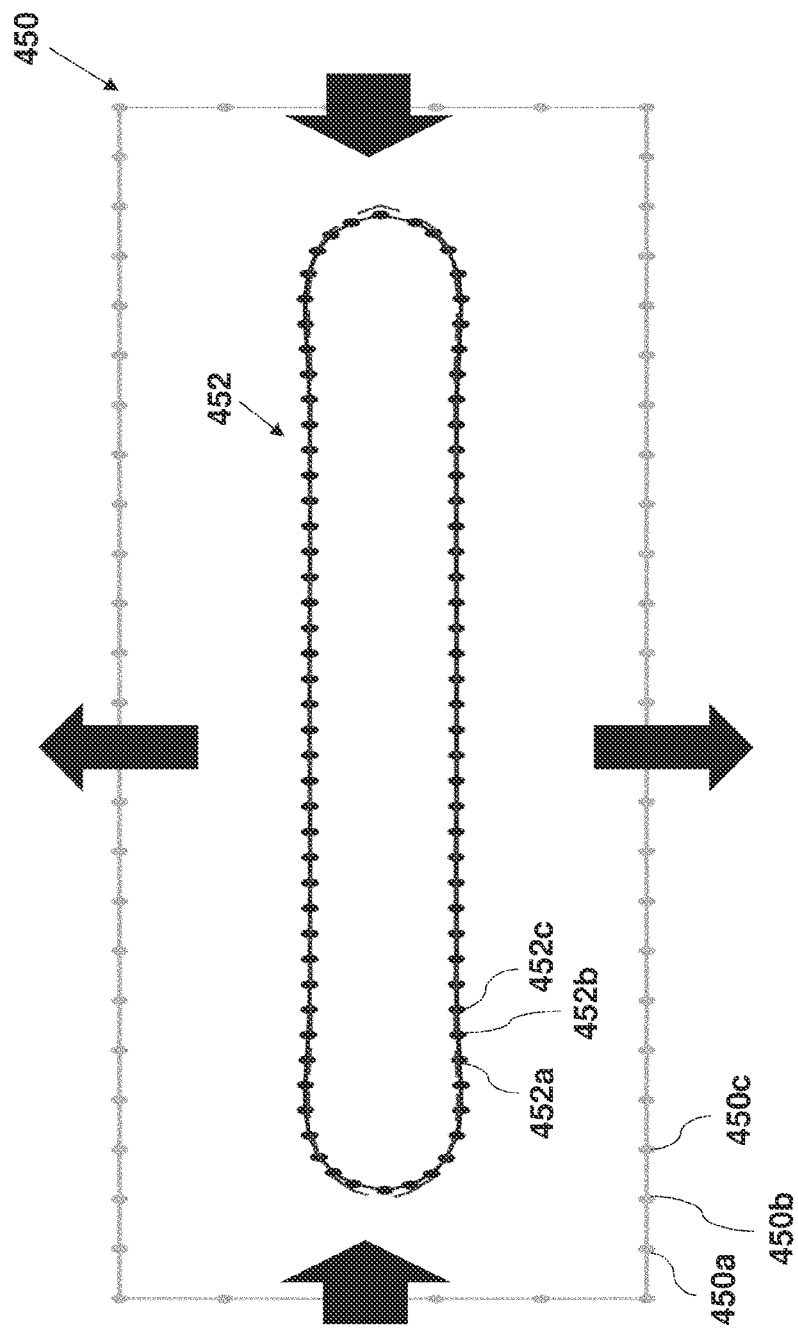
FIG. 4D illustrates resultant outflux in a vertical direction (e.g., along y-axis) and influx in a horizontal direction (e.g., along x-axis) on the resist domain, according to an embodiment.
Figure 4E:
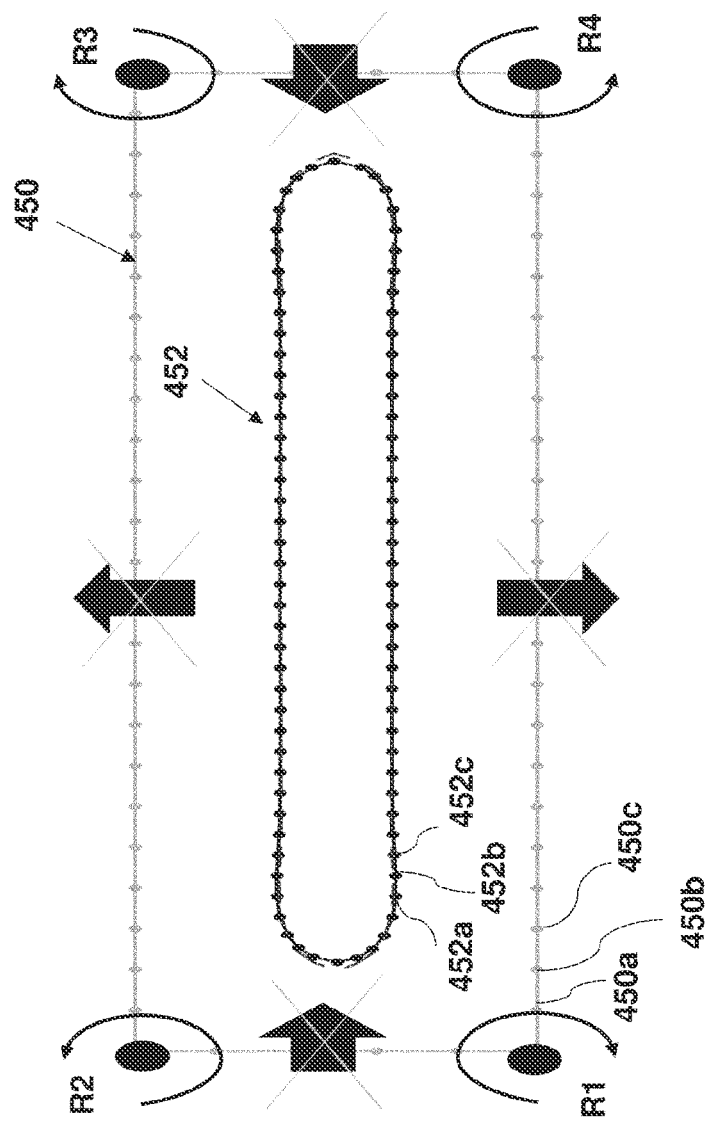
FIG. 4E illustrates an example boundary condition with rotlets R1, R2, R3, and R4 placed at boundary corner points around the feature, according to an embodiment.
Figure 4F:
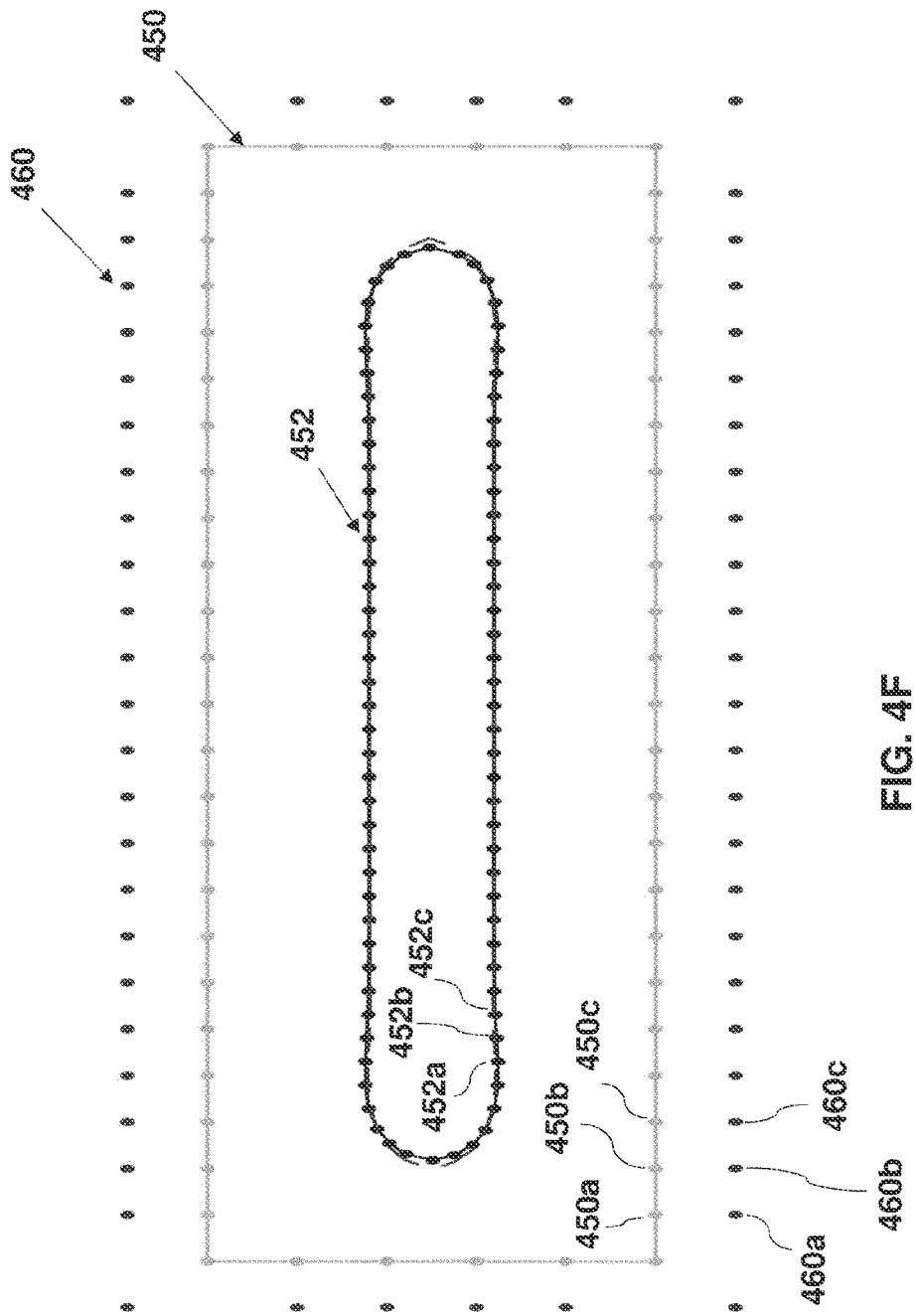
FIG. 4F illustrates an example of the boundary condition referred as a no flux condition, according to an embodiment.

In an embodiment, referring to FIG. 4C, a force Fi at a vertex i determined based on vertex i and neighboring vertices i−1 and 1+1 respectively. In an embodiment, the force Fi is computed based on an interfacial tension (σ) of an interface between the two liquids, and on tangential vectors τ before and after the vertex i. An example equation used to compute Fi is as follows:

$$\vec{F}_i = \sigma\left(\vec{\tau}_{i+\frac{1}{2}} - \vec{\tau}_{i-\frac{1}{2}}\right) \quad (3)$$

$$\vec{T}_{i+\frac{1}{2}} = \frac{\vec{r}_{i+\frac{1}{2}}}{\|\vec{r}_{i+\frac{1}{2}}\|} \quad (4)$$

$$\vec{r}_{i+\frac{1}{2}} = \vec{x}_{i+1} - \vec{x}_i \quad (5)$$

In equation 3, a is surface tension at the interface (i.e., at the contour of the feature) which is a property of the resist used for printing a pattern on a substrate. The tangential vectors are computed using equations 4-5. Once, the forces are determined, the velocity resulting from the forces is determined based on, for example, Stokeslets. Further, the velocity determination involves assigning certain boundary conditions on the resist domain, for example, boundary conditions illustrates with respect to FIGS. 4D-4F.

In an embodiment, force points are defined along a wall outside a resist domain to generate an additional velocity field. In an embodiment, a value of a force at each force point is such that the total superposed velocity field adds up to zero velocity at the boundary points (e.g., no flux) or equals velocity for boundary nodes at opposite locations. All force points (e.g., along the wall) together give a set of equations with equal number of unknowns. In an embodiment, a number of force points is approximately (or the same, in an embodiment) to number of velocity nodes at the boundary of the resist domain. In an embodiment, locations of the force points are ideally close but not identical to the velocity node. Spacing of the force points is less than or equal to a minimum distance of a feature to a wall.

In an embodiment, the individual forces along the contour 452 of the resist results in an effective forces acting at the resist domain boundary (e.g., 450) that causes a squeeze mode in the resist domain. Such squeeze mode refers to deformation or movement of the desired features due to effective forces from adjacent features. In an embodiment, the squeeze mode is eliminated by applying one or more boundary conditions, as discussed with respect to FIGS. 4D-4F.

In an embodiment, FIG. 4D illustrates resultant influx in a horizontal direction (e.g., along x-axis) and outflux in a vertical direction (e.g., along y-axis) on the resist domain 450. In an embodiment, the resist domain 450 is considered an infinite domain for simulation purposes. Further, no boundary conditions are defined. As such, multiple features together could result in an overall squeeze mode flow. To eliminate the squeeze mode and retain only a motion of interest (e.g., motion of the feature 452), rotlets R1, R2, R3, and R4 are placed at a boundary corner points around the feature 452, as shown in FIG. 4E. The rotlets R1-R4 produce a flow counter to the one created because of forces along the feature 452. In an example, to counteract, the drawn rotlets R1-R4 in FIG. 4E changes direction (i.e. clockwise changes into anti-clockwise and vice versa).

In an embodiment, the squeeze mode is eliminated by applying rotlets of strength S defined based on making a first moment of all the forces at the vertices of the contour to zero. For example, using equation $S=\Sigma(F_{xn} \cdot x_n - F_{yn} \cdot Y_n)$, where Fxn and Fyn are forces in x and y directions, respectively, n refers to a number of point (e.g., points 450a, 450b, 450c, 450d, etc.) along the resist domain 450 at which the force is determined, and xn and Yn refers to the position of the $n^{th}$-node.

In another embodiment, referring to FIG. 4F, the boundary condition may be a no flux condition achieved by adding n force points 460a, 460b, 460c, etc. on an outside location 460, i.e., at a certain distance from the domain 450 to cancel an outflux and/or influx on the n boundary points 450a, 450b, 450c, 450d, etc., respectively, to impose a no flux condition. The n boundary points 450a, 450b, 450c, 450d, etc. may also be referred to as velocity nodes. Velocity nodes are nodes on the domain boundary at which a velocity field is determined. It is at these velocity nodes, where a boundary condition may be applied.

In some cases, either periodic boundary conditions or wall boundary conditions are needed. In an embodiment, implementing such boundary conditions in a singularity method (e.g., if Green function's is singular in x=0) involves use of fundamental solutions that satisfy the boundary conditions. Unfortunately, deriving the fundamental solution for 2D Stokes flow in a periodic domain is a significant effort and closed form solutions are not found in the state-of-the-art. Instead of using a fundamental solution that satisfies the boundary conditions, the present methods impose boundary conditions directly.

Figure 4G:
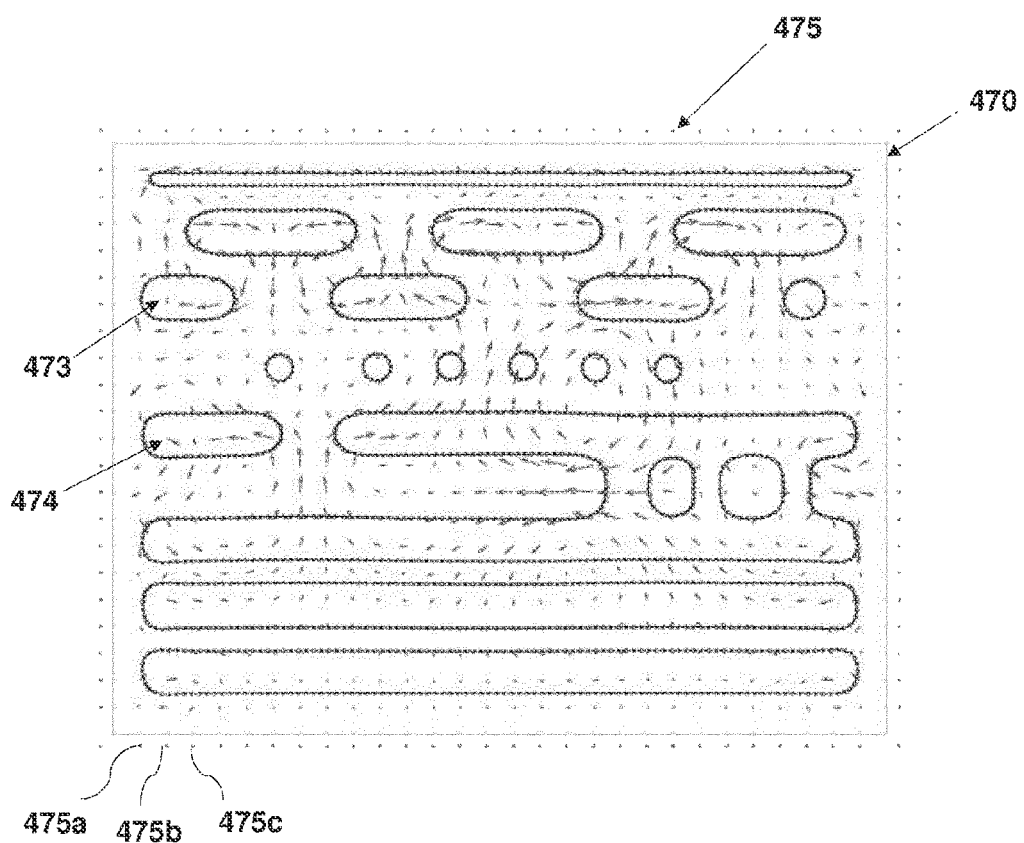
FIG. 4G illustrates an example of a wall condition applied around a resist domain boundary, according to an embodiment.

FIG. 4G illustrates an example of a wall condition. The Figure shows the velocity field due to forces along the contours of the features (or feature in general). At a wall 475 (outside the resist domain), a liquid (e.g., resist within boundary 470) adjacent to the wall 475 moves with the same velocity as the wall. If the wall 475 is stationary, both components of the liquid velocity at the wall 475 are zero. The wall 475 keeps the velocity of the liquid 470 equal to zero by applying a force on the liquid 470. In proposed method, a force is applied on the liquid along its entire length, keeping the velocity zero along its entire length. In an embodiment, the force is applied at a finite number of points 475a, 475b, 475c, etc. (also referred as nodes) along the wall 475. This also implies that the velocity can be set to zero at a finite number of points. These points cannot coincide with the points where the force is applied, since the fundamental solution is singular there, unless we use some regularization. In an embodiment, the nodes (similar to that in FIG. 4F) are placed at a domain boundary 470, and the force points 475a, 475b, 475c, etc. are placed outside of the domain having a distance between force points that is approximately similar to the spacing of the nodes of the domain boundary 470.

In an embodiment, the number of domain boundary points (or nodes) should be large enough to make a truncation error (due to approximations in the model) small enough, but small enough that the calculation time is acceptable. In an embodiment, the spacing between the nodes is not large with respect to the smallest distance of the features to the boundary. In an embodiment, the spacing is equal to the smallest distance of the features to the boundary. Based on such wall condition, the resulting deformation and velocity fields for 2D Stokes flow with wall boundary conditions are illustrated in FIG. 4G. The forces are applied along the wall 475 at the locations marked by dots (e.g., 475a, 475b, 475c, etc.) outside the domain boundary 470. These forces are such that the velocity at the dots along the domain boundary 470 is zero.

Figure 4H:
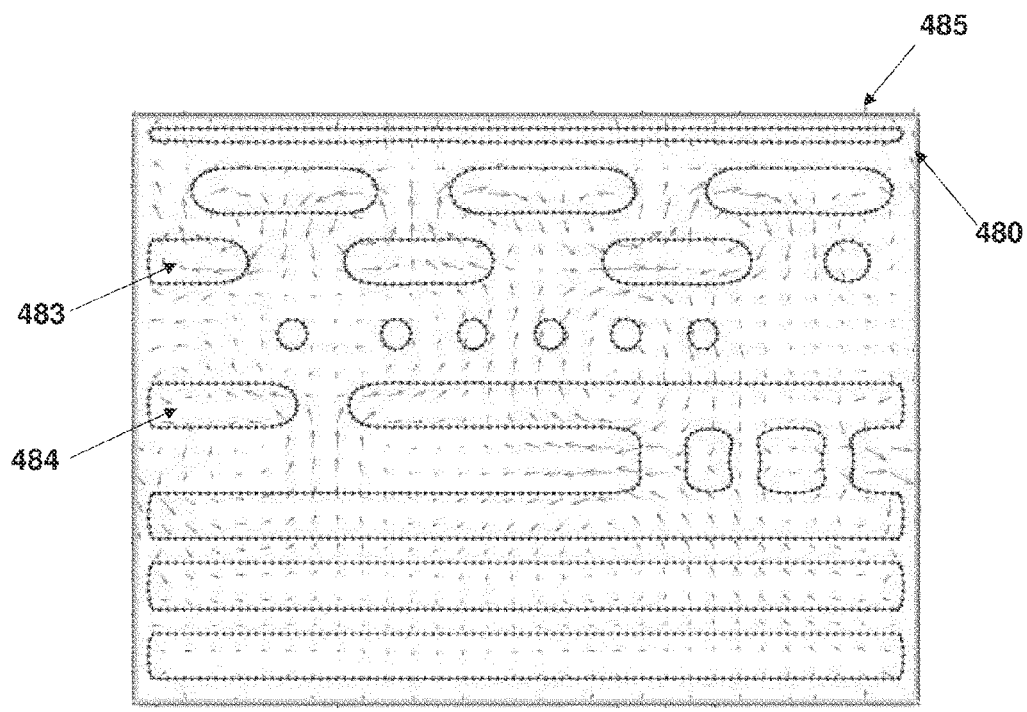
FIG. 4H illustrates an example of periodic boundary conditions applied around a resist domain boundary, according to an embodiment.

In an embodiment, illustrated in FIG. 4H, periodic boundary conditions are applied around the domain boundary. The Figure shows the velocity field due to forces along the contours of the features (or feature in general). Periodic boundary conditions have additional constraints. The first constraint is that the velocity at opposing sides of the domain must be equal. The second constraint is that the stress on a boundary must be opposite to the stress on the opposing side. In an embodiment, such periodic constraint is imposed as pair of equal and opposite forces at any point and its connected point. This ensures that the total force is zero. Since the forces that are to be countered exert no torque, the imposed forces will also have zero torque. If a torque is exerted somewhere in the domain, the periodic boundary conditions algorithm will counter it. The sum of the forces in any pair is zero. So, a difference in a pair of forces is determined. The criterion for the magnitude of this force difference is that the velocity difference at the corresponding nodes of the resist domain must vanish. The velocity at a node due to a pair of forces is obtained by evaluating the difference of fundamental solutions. The requirement that at every node, the sum of these velocities must be opposite to the velocities due to the features, constitutes a system of linear equations, which can be solved using scientific software such as Matlab that is configured to solve a set of linear equation, differential equations, or other mathematical computation.

In an embodiment, the resulting deformation and velocity fields for 2D Stokes flow with periodic boundary conditions is calculated. The forces are applied at the locations (dots) marked along outside boundary 485. These forces are such that the velocity at each dot along the domain boundary 480 is equal to the velocity at the opposing location on 480.

Figure 5:
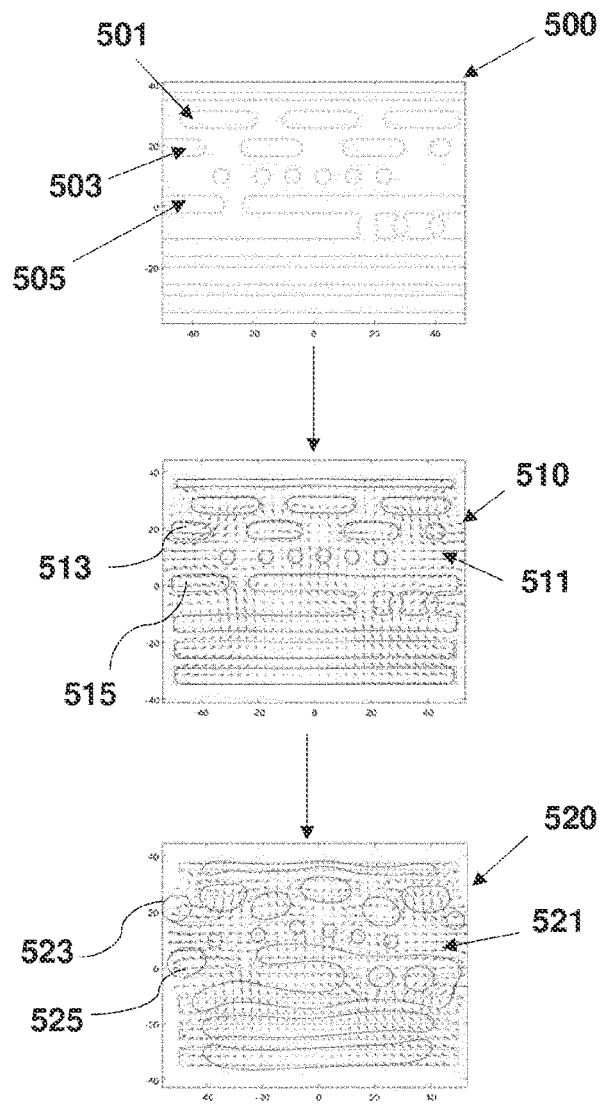
FIG. 5 illustrates another example of determining resist deformation, according to an embodiment.

FIG. 5 illustrates another example of determining resist deformation. As discussed earlier in FIGS. 3C and 4A, contours or extracted contours of the features from the aerial image are converted to polygons. The polygons represent a shape of the contours and may be constrained such that the area of the polygon is preserved. In an embodiment, the polygon includes boundary or edges that are represented by vertices (e.g., represented by dots) in an input 500. In an embodiment, a plurality of vertices are associated with position information along the contours. For example, as shown, the input 500 comprises vertices represented by dotted lines (e.g., 501) of a feature, where each vertex is associated with position information within the input 500. The position of a vertex (e.g., of 501) is represented in terms of Cartesian co-ordinates, polar co-ordinates, relative position with respect to another feature, etc.

The input 500 may include a plurality of features (e.g., bars, holes, lines, etc.) which are converted to polygon or vertices representing polygons. A plurality of vertices of a feature and a location of each vertex thereby represents a geometry of the contour of the feature. In an embodiment, the plurality of vertices are redistributed to make them approximately evenly (or uniformly) spaced while conserving an area (or volume in case of 3D resist deformation process) of the geometry of each contour. Thus, in an embodiment, each feature e.g., 501, 503, 505, etc. of the input 500 may be converted into a plurality of vertices and further the vertices may be redistributed or constrained such that the area of the respective feature or contour representing the feature is conserved.

According to an embodiment, redistribution of the plurality of vertices may be desired to maintain stability during simulation of the resist deformation, as the simulation involves computation of matrix between force and velocity that converts a force to a velocity using, for example, Stokeslets (equation 2, discussed above). For example, the Stokeslet does not have to be evaluated at a source vertex, because the velocity at the vertex can be calculated from continuity once the velocity at the other vertices is known. However, such approach results in truncation errors being collected into the velocity of a vertex. For some vertices, this results in a force to velocity matrix that is not diagonally dominant, leading to an unstable scheme when the velocities are used to advance the positions. Thus, in an embodiment, redistributing the vertices to make the spacing even, may be sufficient to maintain stability in simulation of the resist deformation.

Once the input 500 is obtained, the fluid dynamics of the resist is determined in terms of forces and velocity that represent movement of the contour of the features in the resist. In an embodiment, the forces or a force field are computed on a capillary surface, such as a contour of the feature or polygon and a movement of the plurality of vertices along the contours is tracked.

In an embodiment, a flow of a body of liquid (e.g., resist) is considered to be a 2D Stokes flow, driven by capillary forces in compact area or a selected area (also referred as a resist domain). According to an embodiment, the force on each vertex of the contour is a sum of the tensions on either side of the vertex. This force is exerted along different location on contour of the liquid, so Stokeslet per vertex is determined. The strength of the Stokeslet depends on an interfacial tension (a) of an interface between the two liquids, and on tangential vectors before and after the vertex, as discussed in FIG. 4A, with respect to equations 3-5. In an embodiment, the curvature can be calculated not only between two neighbors per vertex but from more neighboring vertices. In an embodiment, such higher order differencing schemes for the calculation of the capillary forces, i.e., curvature determination based on more than two neighboring vertices are possible. However, such higher ordering differencing schemes make it (too) difficult to determine a scheme that conserves volume and is stable during simulation. Also, the formulation becomes much more complicated, increasing the chance of errors. Existing methods did not use the low order method described herein, as it was believed not to be possible.

In an embodiment, the equations 3-5 are applied to each feature (e.g., 501, 503, 505) and vertices corresponding to the feature of the input 500. Thereby, the input 500 is transformed into a velocity field at a given time step. For example, the velocity field 510 at a first time step t1 is represented. In the velocity field 510, flow vectors 513, 515, 511 are obtained in and around the features (e.g., 503 and 505).

In an embodiment, the forces are applied to the liquid (e.g., the resist) by taking these forces as the coefficients of the Stokeslets, and thus find the velocity anywhere except for the locations of the vertices. The locations of the vertices are excluded because the Stokeslet $G(\vec{x}_i)$ is singular at $\vec{x} = \vec{x}_i$, at the location of the vertex. To obtain the velocities of a vertex, the flow due to the force at that vertex requires special treatment. The flow due to the forces at all the other vertices requires no special treatment. For example, to calculate the velocity at a vertex, only the flow field due to that same vertex needs to be regularized.

Upon further simulation, a velocity field 520 at a second time step t2 is obtained further to the velocity field 510. It can be seen that as the flow progresses, the feature such as 513 (or 515) deform into to deformed feature 523 (or 525). The deformed feature 523 (or 525) appear to be curved or circular compared to the original elongated shape of the feature 503 (or 505) of the input 500. However, as mentioned earlier, constraints applied to the resist domain and the boundary conditions preserves the area of the feature 503 (or 505) upon deformation of the feature. Thus, areas of the deformed features 523 (or 525) and features 503 (or 505) of the input 500 are approximately similar, however, the shape may change substantially. The velocity fields 510 and 520 and deformation of the features shown in FIG. 5 are simply an instance of the simulation of the resist deformation model. For example, simulation of set of equations (1-5) at different vertices along with the boundary conditions as discussed above. In an embodiment, a different instance of deformation may be obtained based on the instance of time for which deformed feature must be determined. For example, the simulation may be run for 10 s, then the result is a deformed resist and corresponding features at 10s. Similarly, the simulation may be run for 20 s, 50 s, etc. to obtain different deformation instances.

As mentioned earlier, during the simulation process, a problem of the singular behavior of the Stokeslet disappears when the applied force is distributed over a line segment, instead of being applied at a single point. In an embodiment, the regularization of velocity field (e.g., based on Stokeslet) may be performed, for example, based on following equation (6).

$$\vec{u}(\vec{x}) = -\vec{F}\left(\ln\left(\frac{1}{2}\|\vec{r}_i\|\right) - 1\right) \tag{6}$$

Equation 6 gives the velocity at the center of a line segment due to a force F that is distributed over the line segment with a constant force density. This velocity is finite for any line segment of finite length, which allows the velocity to be evaluated everywhere.

As mentioned earlier, a polygon (also called contour or feature) in the resist is an approximation of the real interface shape. The presence of sharp corners in this representation is what causes the capillary forces to be concentrated in a finite number of points. In an embodiment, a whole interface is curved so the force is applied over the entire interface. When one vertex is considered, the distribution of the forces over some far away region is relatively less important. How the forces are distributed becomes relevant when the size of that region is comparable to the distance of that region. At a bare minimum, the force due to the sections of interface directly adjacent to the vertex must be distributed over a line segment as calculated above.

In another embodiment, the Stokeslet may not be evaluated at the source vertex, because the velocity at the vertex can be calculated from continuity once the velocity at the other vertices is known. To each vertex, a curve length $|\vec{r}_i|$ is assigned and normal vectors $n_x$ and $n_y$ along x and y axis, respectively, are assigned according to equations 7 and 8 as follows:

$$n_x = r_y \tag{7}$$

$$n_y = -r_x \tag{8}$$

By continuity and the divergence theorem, the total outward flux should be zero, which can be computed based on equation (9) below)

$$\sum_i |\vec{r}_i| \vec{n}_i \cdot \vec{u}_i = 0 \tag{9}$$

With above equation (9), a task of regularization involves determining $u_j$ when $u_{i \neq j}$ are known, such that the continuity equation is satisfied. In other words, velocity is determined at all other vertices, except at i. Equation (9) yields the required velocity directly. Further, with the continuity based regularization, redistributing the points to make the spacing even maintains stability during simulation.

According to an embodiment, a limitation of 2D Stokes flow as a model for resist deformation is domain size matters. For a given forcing, the velocity field depends on the location of the wall around the resist domain. In an infinite domain, the velocity diverges. So, in an embodiment, the mitigation for velocity divergence is to only consider force distributions that sum to zero. So, the flow field due to a distribution of features with capillary forces that spans a large part of space is calculated. The contribution to the velocity field due to features that are far away should be small. This requires a velocity field that falls off as $r^2$. As such, the velocity field due to the capillary forces on the features is decomposed. In an embodiment, the velocity field is decomposed into a squeeze flow (see FIG. 7) and a part that falls off as $r^2$ or faster. The squeeze mode velocity field is driven by the diagonal part of $\vec{\tau}$, the moment of force. In an embodiment, in order to remove the squeeze mode, a constraint is defined such that the sum of the diagonal part of the moment of force of the Stokeslets, and of the squeeze mode flow field is added to zero.

Figure 6:
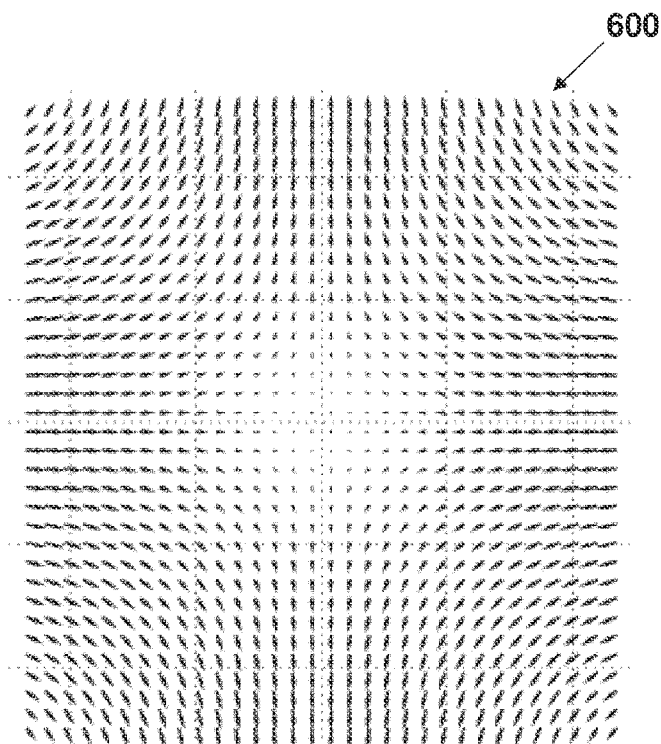
FIG. 6 illustrates a squeeze mode velocity field, according to an embodiment.

FIG. 6 illustrates a squeeze mode velocity field 600. This velocity field was calculated by summing Stokeslets at the vertical domain boundaries. The force per unit length on the boundary on the left is constant, and opposite to the force per unit length in the boundary on the right, which is also constant.

In a different approach, as mentioned earlier with respect to FIG. 4F, a zero total flux condition is imposed through the horizontal walls of the resist domain, and thus zero flux through the vertical walls, by adding an extensional simple flow.

In the direct implementation of the Stokeslet based calculation, every boundary point directly influences every other boundary point. Therefore, in the limit of a large number of boundary points N, the required number of floating point operations (FLOPS) to calculate the velocity field is quadratic (i.e., $N^2$).

In an embodiment, to improve scaling in the Stokeslet based calculation, the velocity field due to far away features is replaced with their truncated multipole expansion. In the simplest form of the multipole expansion, only the squeeze mode is retained and all higher order terms are neglected. This is because the influence of all the squeeze mode terms does not converge as more distant terms are included, while the higher order terms due to features at a distance between R and R+dR goes to zero as R increases. The squeeze mode flow due to each distance feature is calculated, and each feature is replaced by a combination of 4 rotlets as described earlier. These rotlets are placed at the corners of a rectangle that is not large with respect to the replaced feature, such as the bounding rectangle of the feature. Thus, for each feature whose influence is simplified in this way, the number of points in the global calculation N is reduced by n−4, at a cost of summing n forces. This is a significant improvement since the computational cost in the global calculation scales with N^2. Thus, in an embodiment, the scaling of the velocity calculation with n points per feature and m features is improved from $n^2m^2$ to $n^2+nm^2$. For example, assuming that $n=10^3$ and $m=10^9$, this implies a $10^3$ fold improvement, which is significant. In an embodiment, the scaling can be further improved by collecting the multipole expansions of features in relatively far away regions (e.g., using a fast multipole method).

Furthermore, in an embodiment, a further improvement in calculation time can be obtained by neglecting even more distant features entirely. In this approximation, there are only local interactions. The distance at which interactions are neglected can be specified as a tolerance on the relative magnitude. As relative magnitude, a ratio of velocity at a given distance may be taken over the velocity at a distance equal to the feature size. For instance, if a tolerance of 14% relative error due to this approximation is set, and a tolerance of 5% relative error due to the point spacing is set, the total relative error is below 20%. The cut off distance for each feature is calculated as the distance where the relative magnitude of the multipole expansion of that feature drops below the tolerance. This gives a calculation time scaling that is linear in the number of features and in the number of points per feature. In other words, FLOPS is approximately nm.

After the velocity fields are computed, a final deformation is determined at a desired location. The desired location may be any point in the resist, a point on a contour of a desired feature, or a plurality of points on a desired contour. In an embodiment, the final position at any time "t" is determined based on integration of the velocity field at or around the desired location. For example, the final displacement may be determined using a displacement equation 11 as follows:

$$\vec{x}_i(t) = \int_{t_e}^{t} \vec{u}(\vec{x}_i(t)) dt \tag{11}$$

In the above equation, $\vec{x}_i(t)$ is the displacement a point i at time t, and u is the velocity field determined, for example, using Stokeslets, as discussed earlier. In an embodiment, the velocity field $\vec{u}$ is determined between times $t_0$ (i.e., a start time) and $t_e$ (i.e., an end time of simulation). In an embodiment, the input (e.g., in FIG. 4A, 500), the velocity field (e.g., 510, 520) may be represented as pixelated images. Thus, in an embodiment, pixel values at time t o at any position may be determined by interpolation. The pixel values should be constant along a curve in space-time that is traced out by points moving with the fluid (e.g., the resist). Thus, a point i may correspond to a pixel value and displacement of the pixel correspond to displacement of the resist.

In an embodiment, feature shapes are obtained from an image by a contour finding algorithm. In an embodiment, changing a value of the contour may be desired without redoing the force and velocity calculations. Thus, in an embodiment, an input image may be calculated after deformation according to the 2D Stokes flow. Such reverse computation of an input image from deformation also allows further analyses that may be needed. For example, an option of calculating only a part of the image, such as an immediate neighborhood of the deformed contour, may be desired, as illustrated in FIG. 7.

Figure 7:
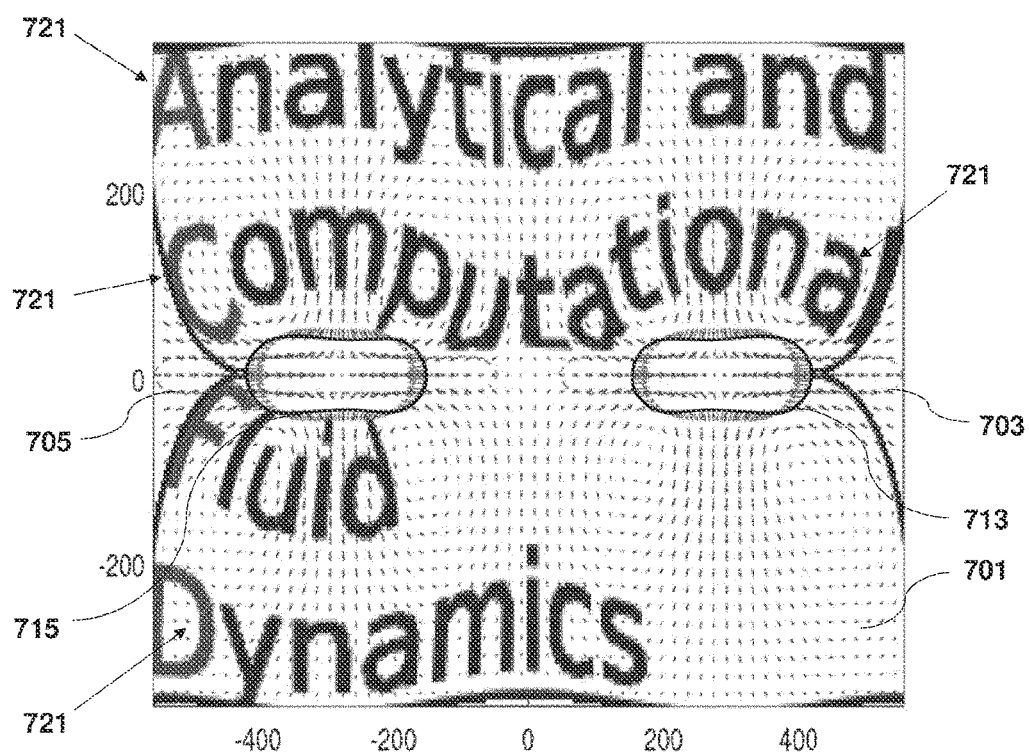
FIG. 7 illustrates examples of initial feature shapes and deformed features corresponding to the initial features, according to an embodiment.

In FIG. 7, initial feature shapes 703 and 705 (rounded elongated rectangular features) are shown for reference, and deformed features 713 and 715 correspond to the initial features 703 and 705. The deformed features 713 and 715 are obtained from simulation of forces and velocities corresponding to the initial features 703 and 705 based on the resist deformation model and the simulation process discussed with respect to FIGS. 4A and 5. In an embodiment, not only deformation of the initial features 703 and 705 is determined, but also deformation of an immediate neighborhood of the resist represented by several instances of 721 can be determined, for example, based on forces and velocities acting on the contour of the deformed features 713 and 715.

In an embodiment, the deformation of the entire resist domain may be obtained, for example, using position information and the displacement equation 11 above. Based on the equations (e.g., 2-11), the deformation may be determined for each pixel of the velocity field, thereby resulting in deformation of an entire resist domain.

It can be understood by a person skilled in the art that the above methods and examples were explained with respect to 2D Stokes flow for conveying the concepts. However, the above methods are not limited to 2D Stokes flow, and any other flow may be used to represent fluid dynamics model and related boundary conditions may be applied to determine forces and velocity field. In embodiment, the 2D Stokes flow driven by capillary forces may be local in nature to a desired feature, so for any required accuracy, there is a distance at which the velocity field may be neglected due to feature edges that are further away than this distance. For example, the fluid dynamics model may be based on Hele-Shaw flow, which may provide a more global solution. In Hele-Shaw flow, the velocity flow is solenoidal, which is useful to obtain the velocity of the force point due to its own force. The fundamental solution for (depth averaged) Hele-Shaw flow is simply a replacement for the Stokeslet. Thus, the velocity response due to a point force for the Hele-Shaw flow may be determined by replacing the function G (e.g., of equation 2) related to 2D Stokes flow with a different function G related to Hele-Shaw flow.

Figure 8A:
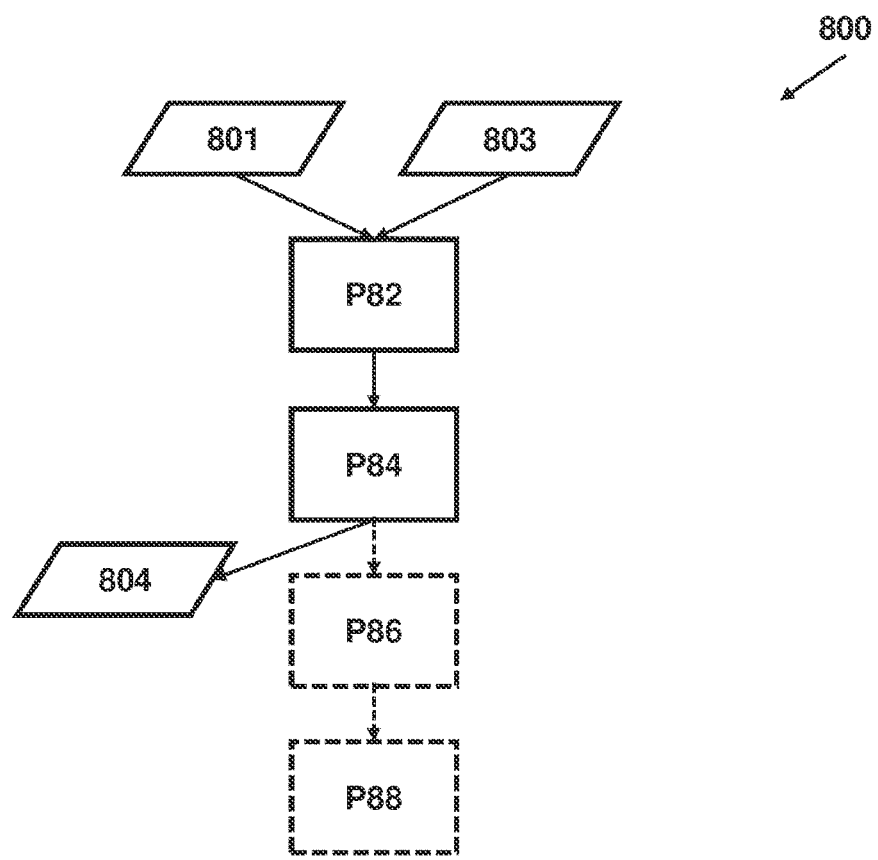
FIG. 8A is a flow chart of a method for determining resist deformation, according to an embodiment.
Figure 8B:
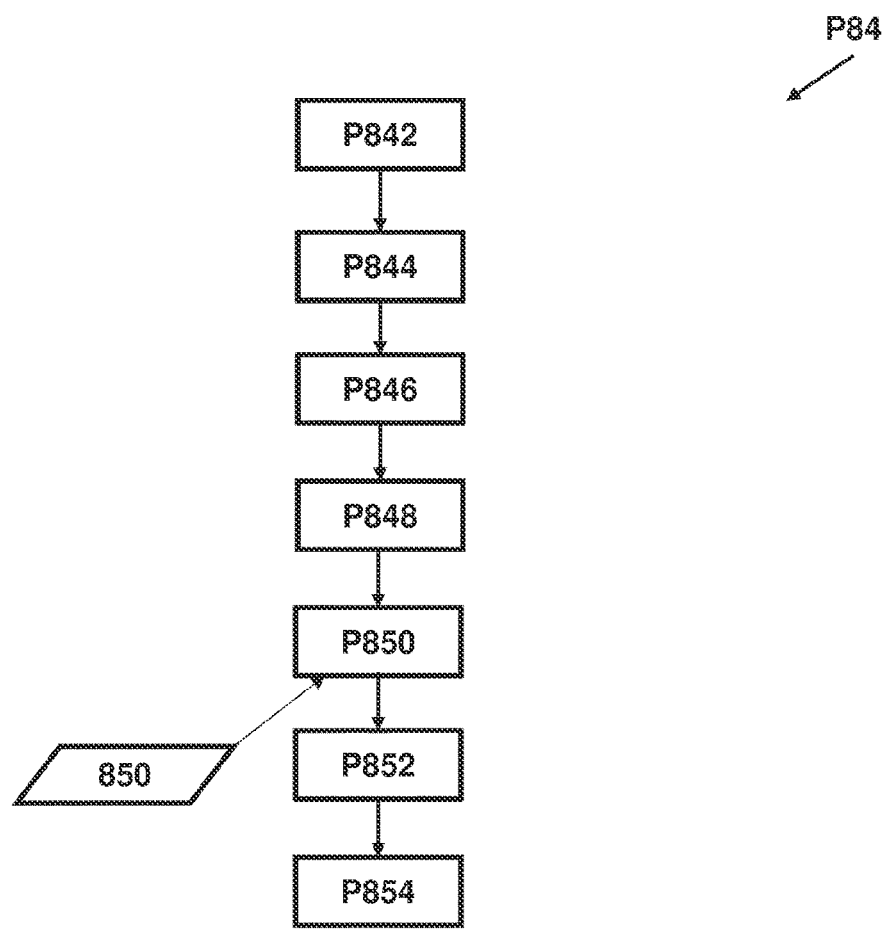
FIG. 8B is a flow chart of a method of simulation of the resist deformation model used in FIG. 8A, according to an embodiment.

In an embodiment, referring to FIGS. 8A and 8B, there is provided a method 800 for determining resist deformation and further apply the resist deformation model to adjust parameters of the patterning process. In an embodiment, the resist deformation model may be obtained and simulated to determine the deformation.

The method, in process P82, involves obtaining a resist deformation model 801 of resist having a pattern. In an embodiment, the resist deformation model is configured to simulate a fluid flow of the resist due to capillary forces acting on a feature contour of the pattern. Further, in an embodiment, an input pattern 803 (e.g., as in FIG. 3C) may be obtained to be processed by the resist deformation model 801. In an embodiment, some other quantity that represents the presence of a feature at that location is thresholded to obtain the feature boundaries. Examples of other quantities include, but are not limited to, a red component of a color image, a blue component of a color image, a green component of a color image, the hue of an image, the saturation of an image, pixel values of an image, etc. The input pattern 803 may also be the output from a convolutional filter or another edge detection filter.

In an embodiment, the resist deformation model may be obtained as discussed for example, as discussed above with respect to FIGS. 4A and 5. In an embodiment, the resist deformation model is a fluid dynamics model. In an embodiment, obtaining the resist deformation model involves generating the model including defining a fluid dynamic model and defining boundary conditions, as discussed in FIGS. 4A and 5. In an embodiment, obtaining the resist model involves receiving the resist model via a network. In an embodiment, the resist model may be received from a database or the process may be configured to communicate with another process on which the resist model is implemented. In an embodiment, the fluid dynamics model is based on a linearized Navier-Stokes flow equations, as discussed in FIG. 4A and FIG. 5. For example, the fluid flow is characterized by a 2D Stokes flow (an example of Stokes flow) or a Hele-Shaw flow.

The method, in process P84, involves determining, via a processor (e.g., processor 104) and simulation of the resist deformation model (e.g., 2D Stokes flow based equations 2-11 and corresponding boundary conditions in FIGS. 4E-4H), a deformation of a developed resist pattern for an input pattern 803 to the resist deformation model. Depending on the boundary conditions and the velocity field, the deformations obtained may vary. For example, as discussed with respect to FIG. 4G shows deformation corresponding to wall boundary condition, 4H shows deformation when periodic boundary condition is applied, FIG. 7 illustrates a deformation of a part of a resist domain.

In an embodiment, the simulation further involves following processes such as P844-P848 discussed with respect to FIG. 8B. In an embodiment, the simulation involves defining initial vertices along the feature contour, in process P842. In an embodiment, the initial vertices may be rearranged to satisfy a particular condition such to stabilize the simulation process. For example, process P844 involves redistributing the vertices to make them evenly spaced while conserving an area or a volume of the feature contour of the pattern.

Further, the simulation process, in process P846, involves determining a capillary force at a given vertex along the feature contour of the pattern. In an embodiment, the capillary force acting on the given vertex is a sum of tensions on either side of the given vertex. The force can be determined, for example, using equations 3-5. In an embodiment, the forces may cause a squeeze flow which is a flow of resist due to a net inward flux or a net outward flux through the vertical resist domain boundaries causing a large scale migration of the features. Such squeeze flow (e.g., as shown FIG. 6) may be eliminated by applying appropriate boundary conditions as discussed with respect to FIG. 4A.

Process P848 involves applying a boundary condition to the fluid dynamics model, for example, to eliminate a squeeze flow. Examples of boundary conditions and how to implement such boundary conditions are discussed with respect to FIGS. 4A-4H, earlier in the disclosure.

Once the forces and boundary conditions are applied, process P850 involves determining a velocity field 850 (an example of 520 of FIGS. 5 and 721 of FIG. 7) of the fluid flow due to the capillary forces based on superposition of Stokeslets and the boundary conditions. In an embodiment, the process P850 involves obtaining velocity at a given vertex along the feature contour based on the velocities of all other vertices due to a capillary force at the given vertex. This is achieved by multiplication of the force at the given vertex with the Stokeslet centered on the given vertex, an evaluating it at the other vertices. The velocity at the given vertex due to the force at the first vertex is such that the velocity conserves the area or volume of the feature. In an embodiment, the velocity is in the normal direction to the force.

In an embodiment, the squeeze flow may be determined by decomposing the velocity field and determining appropriate boundary conditions to eliminate such squeeze flow. For example, process P852 involves decomposing the velocity field 850 in to the squeeze flow (e.g., 600 of FIG. 6) and a higher order velocity flow (not illustrated). Then, process P854 involves eliminating the squeeze flow from the velocity field by applying the boundary condition. In an embodiment, the boundary condition comprises: setting a flow rate through the boundary of the resist to zero; and/or setting a velocity across the boundary of the resist to no-flux condition. As discussed earlier, the flow rate into the domain through the vertical boundaries is set to zero by providing a combination of rotlets (e.g., see FIG. 4E) of appropriate strengths (e.g., using the equation as discussed with respect to FIG. 4E) at the corners of the boundary of the resist domain. In an embodiment, the rotlets of equal magnitude and alternating signs at are placed at four corners of the resist domain.

Turning back to FIG. 8A, the method, in process P86, may optionally involves determining forces at a partial area within the resist and obtaining a deformation of the entire area of the resist based on the simulation of the resist deformation model using forces at the partial area, for example, as discussed with respect to FIG. 7.

In an embodiment, the method may involve, in process P88, simulation for obtaining the resist deformation at a desired instance of time via simulation of the resist deformation model till the desired instance of the time. In an embodiment, contributions to the velocity field due to features further away from a region where the capillary forces are applied are negligible.

As discussed earlier, the input pattern (e.g., FIG. 3C) is provided to resist deformation model in the form of an image of the input pattern. The image may be a binary image. In an embodiment, the input pattern is a design pattern, a resist image, a mask pattern, and/or an aerial image. In an embodiment, obtaining the input pattern comprises generating the binary image. The binary image may be generated by obtaining a patterning device pattern corresponding to the input pattern, producing, via simulation of patterning process, an aerial image based on the patterning device pattern; and extracting boundaries of the pattern in the aerial image to generate the binary image.

In an embodiment, the above methods 400, 500 or 800 may further involve computing, using the resist deformation model, a critical dimension between a pair of locations disposed on a boundary of the developed resist pattern and calculating an error between the computed critical dimension and a measured critical dimension of an actual developed resist pattern. Such CD and error values may be further used to perform optimization of the patterning process, for example, OPC, mask optimization, source optimization or a combination thereof.

In an embodiment, the deformation is determined at a plurality of locations, each location corresponding to a point that lies on a boundary of a developed portion of the developed resist pattern for the input pattern. In an embodiment, the resist is a negative tone resist or a positive tone resist, chemically or not-chemically amplified.

Figure 9:
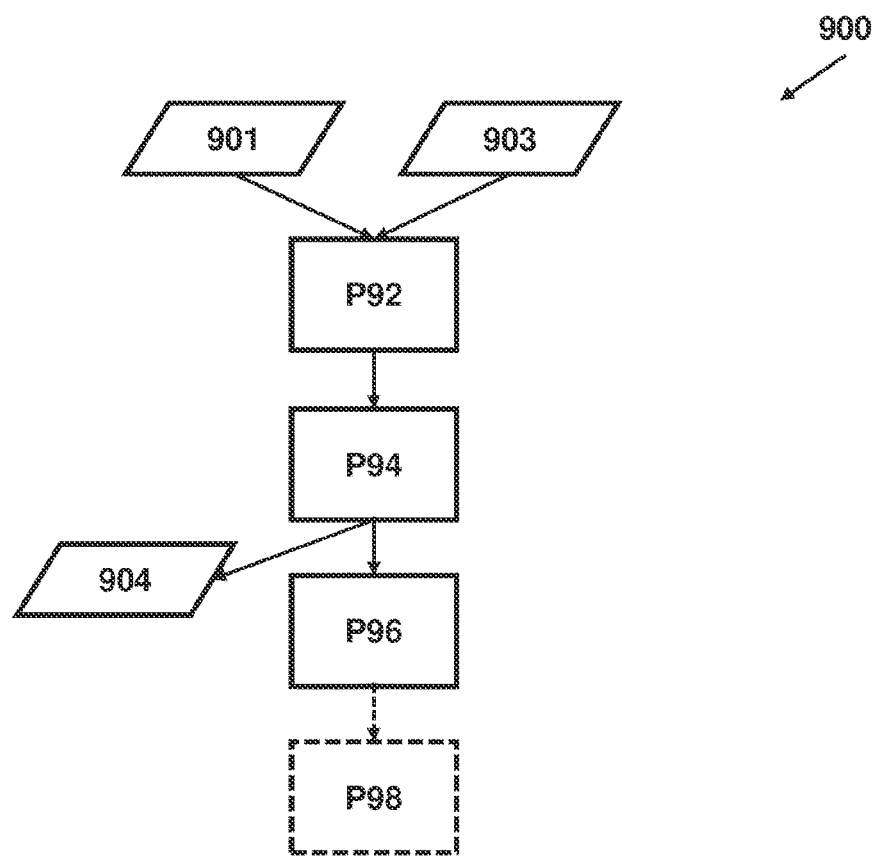
FIG. 9 is a flow chart of a method for determining a parameter of a patterning process based on a resist deformation computed based on the resist deformation model, according to an embodiment.

FIG. 9 is a flow chart of a method 900 for determining a parameter of a patterning process based on a resist deformation computed based on deformation model discussed above. The method 900, in process P92, involves obtaining (i) a patterning process model 901 that includes a resist deformation model (e.g., discussed with respect to methods FIG. 4A and Figure of a resist having a pattern, and (ii) a target pattern 903 (e.g., a design pattern). The resist deformation model is configured to simulate a fluid flow of the resist due to capillary forces acting on a contour of at least one feature of the pattern. In an embodiment, the resist deformation model is a fluid dynamics model configured to simulate a fluid flow of the resist due to capillary forces acting on a feature contour of the pattern.

Process P94 involves determining, via a processor (e.g., processor 104), a resist pattern 904 based on a simulation of the patterning process model 901 with the target pattern 903 as an input to the patterning process model, where a difference exists between the resist pattern and the target pattern. Examples of resist patterns within the resist deformation (e.g., 520) of an example input pattern (e.g., 500 in FIG. 5) are illustrated in FIGS. 5 and 7. The deformation process based on the forces and velocity based on 2D Stokes flow is discussed with respect to the method 400 of FIG. 4A.

Process P96 involves determining, via the processor, a value of a parameter of the patterning process based on the simulation of the patterning process, the value of the parameter being determined such that the difference between the resist pattern and the target pattern is reduced. In an embodiment, the parameter of the patterning process comprises at least one of dose, focus, optical proximity correction. For example, the resist deformation model may be included in the resist model of the resist process of the patterning process. Simulation of the patterning process using such resist model can allow optimization of the patterning process including determining optimum values of parameters such as dose, focus, optical parameters, OPC, etc. The optimization process may involve reducing a cost function including the difference between the resist pattern and the input pattern.

Process P98 involves applying the value of the parameter of the patterning process to a lithographic apparatus during the patterning process. A wafer printed based on such parameter values may be further measured (e.g., using optical tools or SEM) and used to verify the results of the deformation model. For example, a SEM image of the printed wafer obtained via a metrology tool. The SEM image may be further processed to determine resist patterns which can be compared (e.g., EPE between patterns of simulation image and SEM image) with the deformation obtained at a desired instance of the simulation of the deformation model. Based on the comparison, the fluid dynamics model may be validated or modified. For example, additional error or penalty terms may be included in the deformation model. The error or penalty terms may account for such difference in simulated and actual measured values of the substrate.

While embodiments have been described in terms of binary images as the resist pattern image, in an embodiment, the input resist pattern image can be grayscale and/or the output deformed resist pattern image can be grayscale. Further, while embodiments have been described in terms of usage of images, it will be appreciated that the resist pattern can be more generally characterized in terms of data, such as CDs, coordinate locations, vectors, etc. and so the input resist pattern data and/or the output deformed resist pattern resist deformation data can be in a non-image form such as CD values, coordinate locations, vectors, etc.

In an embodiment, the fluid dynamics model can be relatively fast by adopting the binarization of the resist pattern image data. Additionally or alternatively, simplification of the Navier-Stokes equations for faster application towards full-chip solutions can be done by discretizing the equations and representing them by a sum of kernel functions.

So, in sum, the effect of intrafluid forces, such as surface tension, on a resist pattern is included in a prediction of a resist pattern using a computational fluid dynamics model. Data regarding the resist pattern (such as an optical image (or image derived therefrom) produced using, e.g., ASML's Tachyon product) is used as an input to the model. In an embodiment, to speed processing, it is binarized to areas that are assumed to be fully developed and a remainder. The remainder resist is treated as a fluid on a laminar two-phase flow field and with constant or non-constant viscosity. Then, intrafluid forces are effectively modeled such as surface tension applied on the boundaries of the developed resist. The model determines, for example, fluid velocity and pressure and consequently the deformation of the resist are calculated by solving fluid dynamics equations such as the Navier-Stokes equations. Thus, fluid dynamics are used to enable resist profile prediction and the fluid dynamics model can efficiently include, e.g., the surface tension effects. In particular, in an embodiment, strain and curvature effects of highly dense patterned shapes are captured by using fluid dynamics.

To make the model suitable for a particular patterning process where values of physical and materials parameters are not known (e.g., where the viscosity, density, etc. is not known), the model can be fitted (e.g., by regression) to measured values on actual deformed features (e.g., experimental CD values in X and Y directions).

Accordingly, in an embodiment, there is provided a method that determines resist deformation which balances accuracy and speed to allow relatively easy integration of resist deformation prediction into existing algorithms for patterning process configuration. For example, in an embodiment, there is provided a fluid dynamics model than can provide better prediction of the deformation of a resist pattern than past modeling. Additionally or alternatively, the fluid dynamics model can provide faster deformation predictions than past modeling.

Figure 10A:
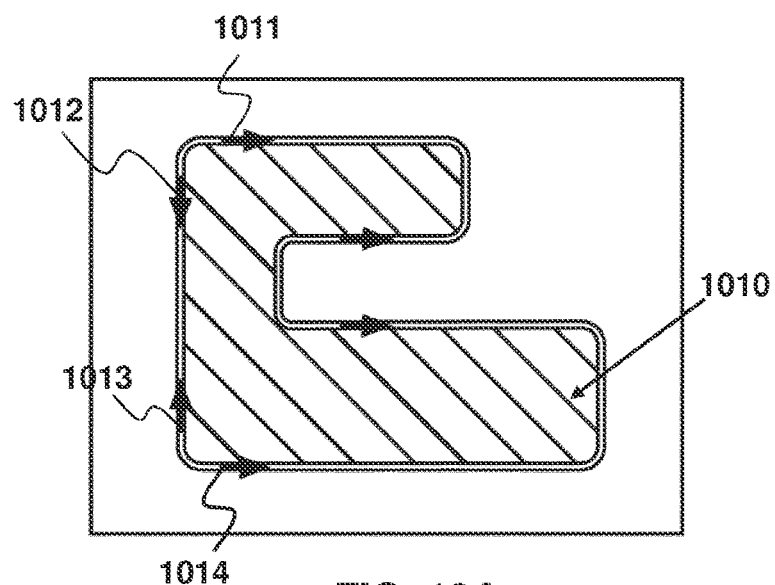
FIGS. 10A and 10B are a top cross-section view and side cross-section view, respectively, of a substrate having resist and a feature therein, according to an embodiment.
Figure 10B:
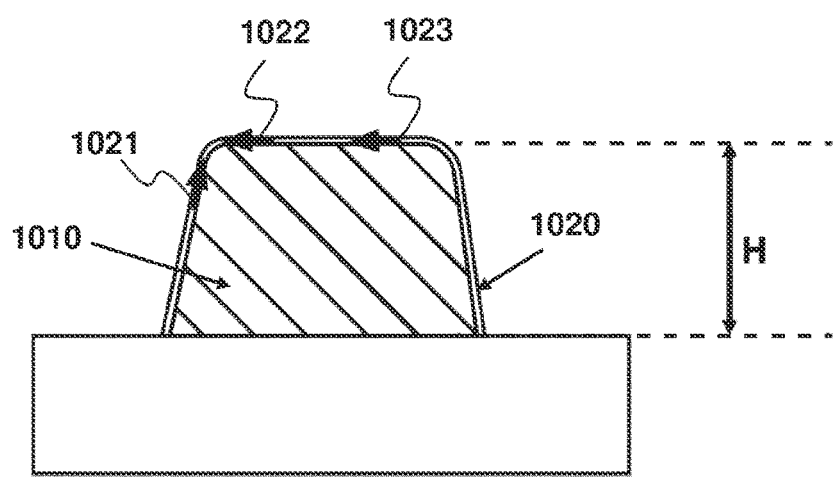
Figure 10C:
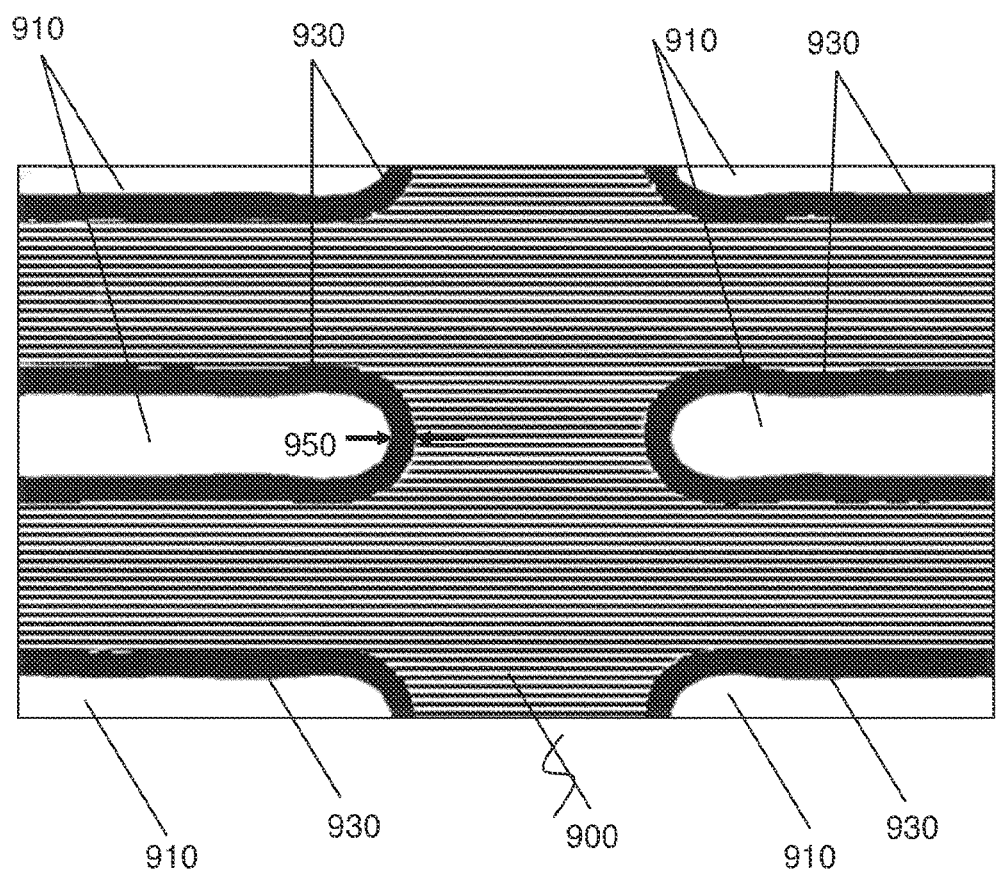
FIG. 10C illustrates a boundary liquid layer around a feature within the resist, according to an embodiment.

During the development stage, a solvent diffuses into the resist 1010 or a feature therein, which softens an outer layer (e.g., 1020) of the resist, as shown in FIGS. 10A and 10B. One way of modelling such behavior is based on assumption that (i) capillary and viscous flow effects are dominant, and (ii) continuum description within the resist and/or a liquid layer associated with the resist holds.

Capillary forces deform this outer layer 1020, either elastically or via viscous flow, until the solvent has evaporated again. Since both deformation processes are approximately governed by the similar equations for small deformations, the flow of a thin layer is considered as viscous flow. According to an embodiment, a thin liquid layer 1020 (also referred as a boundary liquid layer 1020) of the resist 1010 around a feature boundary will flow, driven by capillary forces. As the feature boundary and a liquid layer around the feature are associated with each other and any deformation in the liquid layer causes a change in shape of the feature, the terms "boundary liquid layer," "thin-film," and "contour," or "boundary," of a feature, may be used interchangeably herein. Accordingly, a deformation of the boundary liquid layer refers to a deformation of a boundary/contour of a feature. In an embodiment, features may be represented by their boundaries (e.g., in FIG. 10A) at a specified height H with respect to a surface of the substrate (e.g., as shown in FIG. 10B).

In an embodiment, the fluid flow of the boundary liquid layer 1020 is decomposed into two components: a horizontal flow and a vertical flow, as shown in FIGS. 10A and 10B, respectively. Accordingly, a deformation of the boundary liquid layer (and/or the feature associated therewith) caused by the fluid flow may be a resultant of a first deformation component caused by the horizontal flow component (e.g., 1011, 1012, 1013, 1015, and 1016) and a second deformation component caused by the vertical flow component (e.g., 1021, 1022, 1023). In an embodiment, the boundary of a feature may have a net inward motion at a given height (e.g., H) above the substrate.

As shown in FIG. 10A, the horizontal flow component (e.g., 1011, 1012, 1013, 1015, and 1016) in the horizontal plane acts along a boundary of the layout or geometric shape of the feature (e.g., a line or a circle). The horizontal flow component causes a change in this shape of the boundary liquid layer 1020, but not the total area of the feature. In an embodiment, the horizontal flow depends on a curvature of the feature in the horizontal plane.

As shown in FIG. 10B, the vertical flow component in a vertical plane acts along the shape of a cross section in the vertical plane of the boundary liquid layer (or the feature associated therewith). The vertical flow can change the total area. The vertical flow depends on the curvature in the vertical direction Thus, a resist deformation model (e.g., a thin-film model) is configured to determine the first deformation caused due to the horizontal flow component of the fluid flow and further adjust the first deformation to account for a second deformation caused by the vertical flow component.

In an embodiment, the resist deformation model is configured to capture different aspects (e.g., flow rates, deformations, conservation of mass and/or volume, etc.) of the horizontal flow and the vertical flow components. Furthermore, according to a thin film approximation, the deformation of any feature is independent of the deformation of the other adjacent features. This causes the computation time to be linear in the number of features, which is the best possible scaling. Finally, a direct implementation of the model parallelizes very well since any point (along a contour of the feature) only interacts with its nearest neighbors and its next-nearest neighbors. Furthermore, the resist deformation model is configured to determine deformation of the features, due to shrinkage based on the lubrication approximation. In the lubrication approximation, a vertical shear stress is neglected. The vertical shear stress is negligible if the deformation changes only gradually in the horizontal direction, over distances much longer than the layer thickness.

FIG. 10O depicts a schematic top view of boundary liquid layer adjacent to the feature in the resist according to the present disclosure. FIG. 10O is a top view of a model of an exposed resist having the boundary liquid layer (i.e., a gel-type layer) defined. In this model, a boundary liquid layer 930 having a width 950 (also referred as a layer thickness δ) is defined for the developed or open regions 910 (e.g., trenches). The developed or open region 910, such as a trench, between portions of the resist 900 is formed by the development. In this example, the region 910 would have gas therein.

The resist 900 is specified so as not to deform at all or very little by being specified as a solid with a relatively high modulus of elasticity or a liquid with a high viscosity compared to the boundary liquid layer 930 (e.g., 30% or more greater, 50% or more greater, 75% or more greater, 100% or more greater, 200% or more greater, 500% or more greater, or 1000% or more greater). Indeed, the resist 900 may not even need to be specified in the model and instead a boundary condition is applied to the boundary liquid layer 930 that is tantamount to specifying an adjacent region of high viscosity or an adjacent region incapable of any or much deformation. The boundary liquid layer 930 thus exhibits all, or most, of the deformation into the region 910. In this example, the extension of the boundary liquid layer 930 on top of the resist 900 is not shown. However, all, or part of, the resist 900 may be covered with boundary liquid layer 930.

The resist deformation model is characterized in terms of a boundary liquid layer 930 located at a boundary between a developed or open region of the resist pattern and the resist 900. The boundary liquid layer 930 has a width smaller than the width of the resist at the boundary, the parameter of, or associated with, the boundary liquid layer can be varied subject to an appropriate boundary condition at the boundary of the feature (at the open region) and at a side of the boundary liquid layer opposite to the developed or open region. For example, the boundary condition applied to the boundary liquid layer can be tantamount to specifying an adjacent region of high viscosity or an adjacent region incapable of any or much deformation.

In an embodiment, a resist deformation model is developed under the assumption that capillary and viscous flow effects are dominant. Furthermore, the resist deformation model is developed under the assumption that continuum description holds. Hence, applicability of the model for physical results is limited to a length scale and/or a time scale (e.g., width, a time period of simulating the deformation, etc.). In an embodiment, the width may be a pre-determined amount, e.g., specified by a user and desirably selected such that it is larger than the largest expected deformation toward the essentially insoluble resist. In an embodiment, the width is selected from a range of from 5 nm to 300 nm, a range of from 5 nm to 200 nm, a range of from 5 nm to 100 nm, a range of from 5 nm to 50 nm, a range of from 10 nm to 40 nm, or a range of from 5 nm to 30 nm, or a range of from 5 nm to 20 nm. In such an embodiment, the width may not be varied as part of the calibration routine. Or, in an embodiment, the pre-determined width may be a starting point and the width may be varied like a parameter of, or associated with, viscosity, etc.

In an embodiment, the width may be a range (such as the ranges described just above), which range can act as a constraint. Thus, in such an embodiment, a certain width can be a starting point and the width may be varied like a parameter of, or associated with, viscosity, etc., but constrained within the range given.

In an embodiment, the width can vary at different locations along the boundary liquid layer. For example, the width can be different in different developed or open regions or at different parts along a developed or open region. As another example, the width can be different at an upper surface (e.g., in top view) of the resist rather than in a sidewall (e.g., in side view) of a developed region. In an embodiment, a relationship (e.g., a ratio) can be specified between the sidewall width and the upper surface width so as to constrain the difference in width.

So, in an embodiment, when short-range interaction of forces is desirable, a region of liquid material having a finite (and relatively small such as 30 nm or less) width can be defined at a boundary of a developed or open region and a resist, the region at the boundary having a width smaller than the resist at the boundary. On the side opposite of the developed or open region, the model can have another material, e.g., a solid, that does not deform or deforms significantly less than the material of the region having the finite width (e.g., has a significantly higher viscosity than the material of the region having the finite width) or have a boundary condition that tantamount specifies low or no deformation at that location. As a result, the velocity field at the opposite side can be at or close to zero, thus leading to little or no changes in deformation at that location (and at outward locations therefrom until another region of finite width is encountered).

Figure 11:
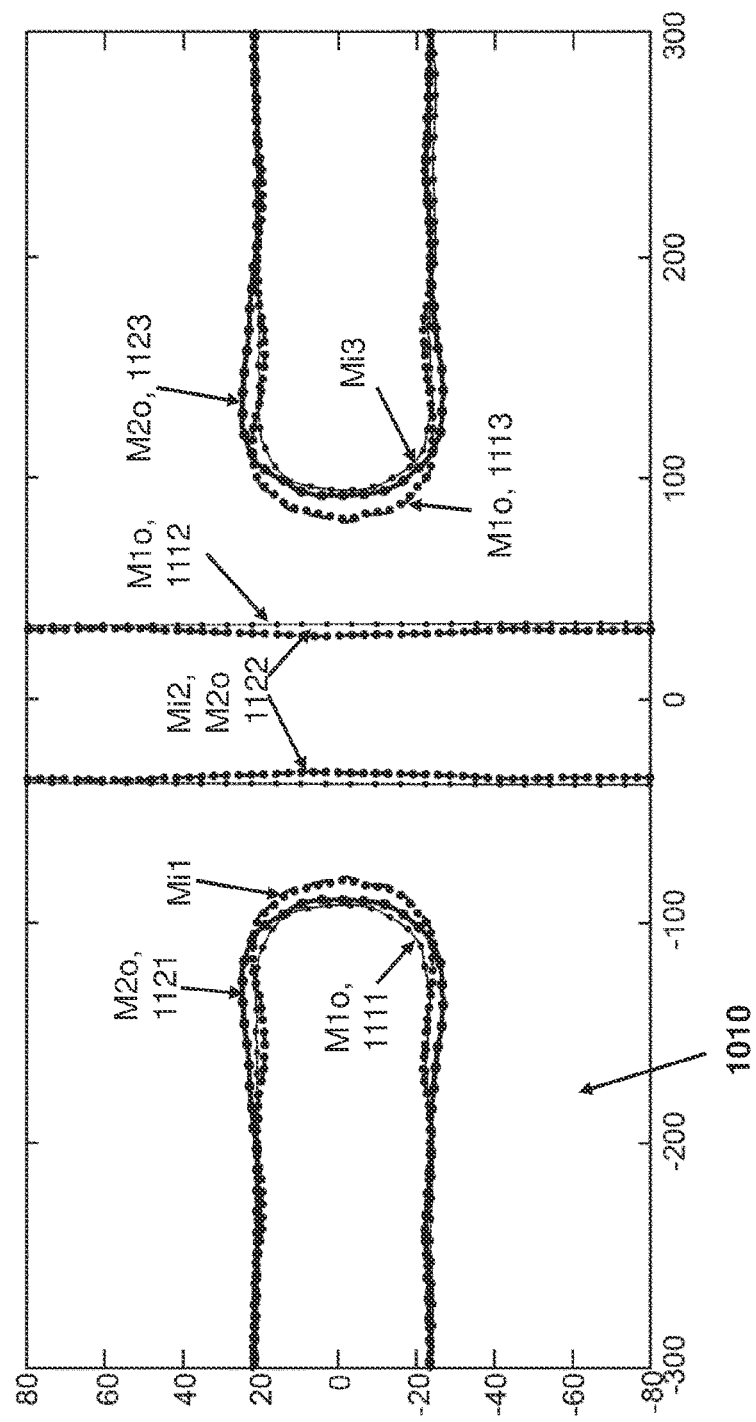
FIG. 11 shows a comparison between an initial contour, a deformed contour based on a full-fluid resist deformation model, and a thin-film based resist deformation model, according to the present disclosure.

FIG. 11 depicts an exemplary schematic output obtained by simulation of the resist deformation model using, for example, pattern information (e.g., contours extracted from an aerial image, as discussed earlier with respect to FIG. 3C). Specifically, FIG. 11 depicts (i) initial contours Mi (e.g., an input contour Mi1, Mi2, and Mi3 extracted from AI), (ii) deformed contours Mlo (comprising contours 111, 1112, and 1113) obtained from a full-fluid dynamics model (i.e., where the entire resist is treated as liquid instead of a thin layer of resist), and (iii) another deformed contours M2$o$ (comprising contours 1121, 1122, and 1123) obtained from the resist deformation model according to present disclosure.

In FIG. 11, the deformed contours 1111 and 1113 (which are part of output Mlo) obtained from the full-fluid model predicts (e.g., Mlo) that the contours are deformed outward into the resist 1010 relative to corresponding input contours Mi1 and Mi2, respectively, and the deformed contour 1112 is deformed inward relative to the corresponding input contour Mi3. Such deformed contours 1111, 1112 and 1113 are caused due to interaction between deformation of the individual contours Mi1, Mi2, and Mi3 since the entire resist 1010 is assumed to be fluid. In other words, deformation of one feature (or the contour thereof) may cause a deformation of a neighboring feature (or the contour thereof).

The deformed contours 1121 and 1123 (which are part of output M2$o$) obtained from the thin film fluid model (of present disclosure) predicts (e.g., M2$o$) that the contours are deformed inward relative to corresponding input contours Mi1 and Mi2, respectively, and the deformed contour 1122 is not deformed or slightly deformed relative to the corresponding input contour Mi3. Within such model, the deformed of one feature is independent of the other neighboring feature, since only a thin layer around the feature is assumed to deform due to fluid flow while regions of resist 1010 further from the thin layer do not deform or only negligibly deform. As can be seen, there is relatively slight, but significant, deformation at curved portions of the contours such as 1121 with respect to the input contour Mi1, and is much different from the deformation of contour 1111 at similar curved portions of the input contour Mi1.

In an embodiment, the resist deformation model comprises formulas related to a thin-film model such as (i) a momentum equation simplified according to the lubrication approximation, (ii) conservation of mass and volume, and (iii) boundary conditions. The following description provides example formulation of the resist deformation model to determine a deformation due to the horizontal flow component and the vertical flow component of the fluid flow of the boundary liquid layer.

In an embodiment, the horizontal flow component of the fluid flow of the boundary layer (e.g., 930) can be determined based on a pressure driven lubrication flow, assuming that the viscosity of the boundary liquid layer is constant. The horizontal flow is determined while conserving volume of the features and volume of the boundary liquid layer. In the horizontal flow, curvature of the contour of feature imposes limiting conditions on the way the deformation occurs. In an embodiment, the deformation computations are performed on a plurality of vertices along a contour of a feature, each vertex being a location on the contour of the feature. The computation also involves determining a Jacobian of time derivative of deformation based on a finite difference method.

Further, as the concave portion of the contour moves, the plurality of vertices may coincide, which is not desired. As such, the plurality of the vertices a redistributed to adjust the spacing between vertices is performed.

In an embodiment, a pressure at a vertex may be determined using following equation.

$$P_i = \frac{\vec{n}_i \cdot \vec{F}_i}{r_{ci}} \quad (12)$$

In the above equation, i is the i-th vertex of the plurality of vertex; $\vec{n}_i$ that is normal to a line between the nearest vertices of i-th vertex; $r_{ci}$ mean distance to the nearest neighbors of i-th vertex, where if x is a location of the vertex then $r_{ci}$ is given by $$\frac{1}{2}|\vec{x}_{i+1} - \vec{x}_{i-1}|;$$

and $\vec{F}_i$ is force at i-th vertex. In an embodiment, the force can be determined using, e.g., the Stokeslet based model, not using the full-fluid model, but only the process to determine the force, discussed earlier.

According to the present disclosure, the fluid flow rate depends on the viscosity μ, the boundary liquid layer thickness δ, and the pressure gradient $\partial_x P$ in a horizontal plane.

To calculate the flow rate, velocity u is integrated over the layer thickness δ. According to the present model, the viscosity does not depend on the shear rate of strain i.e., the boundary liquid is Newtonian. The viscosity may depend on height H of the resist. For simplicity of explaining the concepts, the viscosity is assumed constant over the layer thickness. However, viscosity may vary.

The velocity can be determined based on a momentum equation in the lubrication approximation, and boundary conditions as described by following set of equation:

$$\partial_y^2 u = \partial_x P \quad (13)$$

$$u=0 \text{ at } y=0 \quad (14)$$

$$\partial_y u=0 \text{ at } y=\delta \quad (15)$$

In the above set of equation, y is the coordinate in the normal direction, i.e., the distance from the solid surface (i.e., resist) around the feature, and x is a tangential coordinate. In an embodiment, a dynamic boundary condition set as the velocity gradient $\partial_y u$ being zero at a free surface (e.g., an outer edge representing a surface of the boundary layer at a counter of a feature). Further, a kinematic boundary condition is set as the velocity u is zero at the solid (e.g., an inner edge representing a surface of the boundary layer at side opposite to the contour of the feature).

As the pressure changes, the above equation may cause the layer thickness to take zero or negative values, which may make the simulation unstable. Hence, the layer thickness is determined midway between points i-th vertex and i+1-th vertex, as follows: $\delta = \min(\delta_i, \delta_{i+1})$ Further, the pressure gradient $\partial_x P$ is between points i-th vertex and i+1-th vertex (e.g., midway).

Then, the velocity can be computed using following equation:

$$u = (\partial_x P)\frac{1}{2}(\delta^2 - (\delta - y)^2) \quad (16)$$

Further, integrating of the velocity gives the flow rate Q (e.g., equation below) of the boundary layer in the horizontal plane. This formula gives the flow rate Q from one vertex to the next vertex, as a function of the pressure gradient and the layer thickness between those vertices.

$$Q = \int_0^\delta u \, dy = (\partial_x P)\frac{1}{3}\delta^3 \quad (17)$$

Furthermore, a time derivative of a state variable comprising a layer thickness is determined per time step. For example, $d_t \delta = (Q_{i+1/2} - Q_{i-1/2})/r_{ci}$. In an embodiment, the time derivative of the thickness may be integrated to determine thickness at any given point.

The time derivative computation involves computation of Jacobian of time derivative, for efficient computation. The time derivative of a point (e.g., i-th vertex) depends on a position of its nearest neighbors and its next-nearest neighbors. Such Jacobian is a pentadiagonal matrix, and thus very sparse. The Jacobian matrix can be calculated in many different ways. In an embodiment, the penta-diagonal refers to a main diagonal (i.e., longest diagonal of a matrix such as passing through (1,1) to (n, n) in case of a square matrix) having non-zero elements and two diagonals adjacent to the main diagonal having non-zero elements, while remaining elements of the Jacobian matrix is zero. At first glance, automatic differentiation (e.g., via pre-defined ODE solver) may be employed. However, this may make the code harder to read and less portable. For these reasons, automatic differentiation is undesirable. In an another embodiment, the Jacobian matrix may be computed analytically. However, analytical computation require configuring and reconfiguring the governing equation and their derivative, which is highly time consuming and prone to errors. On the other hand, according to the present model, the resulting Jacobian is sparse, which enables use of finite differencing may be used. The finite difference method provides faster computation time and less cost, as it takes only, for example, 6 evaluations of the derivative when a vertex and it four neighboring are used in computing the deformation.

Further consideration in determining the deformation due to horizontal flow involves concave corner or rounded edges. In concave corners, vertices will approach each other. Eventually, they will meet. When that happens, the thin film approximation may become invalid, because a radius of curvature should be large with respect to the layer thickness. When the vertices meet, the radius of curvature is zero. Thus, when vertices coincide, the normal direction is undefined, resulting in an unstable simulation. To mitigate this issue, the plurality of vertices are redistributed continuously, so that they cannot coincide. The present disclosure is not limited to redistributing vertices continuously i.e., at each time step, a person skilled in the art may perform redistribution at discrete time interval as well.

In an embodiment, the redistribution of vertices to may be defined on a time scale that is at least of the order of magnitude as a time scale of the evolution of the layer thickness. By continuity, a decrease in layer thickness per unit time can be determined as the derivative of the flow rate with respect to the tangential coordinate. The time scale so obtained may be different for different vertices.

Further, it is determined how to redistribute the vertices, and how that changes the layer thickness of each vertex. An example redistribution is based on three specifications as follows. First, the redistribution should conserve the total volume of the feature. This is achieved by moving any vertex only in a direction parallel to the line between the nearest neighbor vertices. Second, the redistribution should converge, i.e., it should not have any growing modes. This can be achieved by using diffusion of a vertex spacing as the redistribution, where a speed of each vertex is proportional to its distance to a line halfway between the nearest neighbor vertices. The constant of proportionality determines the time scale of the redistribution. Third, the volume of the boundary liquid layer should be conserved. This can be achieved by evaluating the geometric representation of the boundary liquid layer.

Figure 12A:
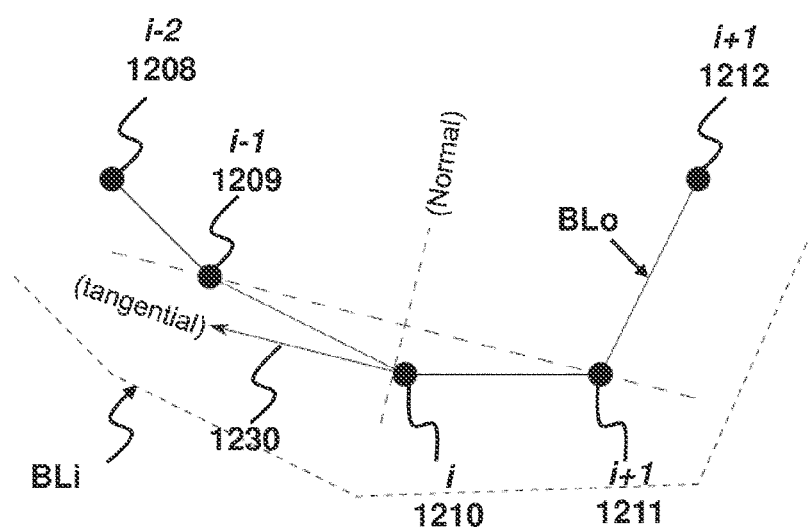
FIG. 12A illustrates example vertices and their movement according to the boundary liquid layer of FIG. 10C based resist deformation model, according to the present disclosure.

Referring to FIG. 12A, the boundary liquid layer is represented by a layer thickness and vertex positions. An inner edge BLi, between the boundary liquid layer and the solid part (i.e., resist), is drawn with a dashed line. An outer edge BLo is drawn with a solid line and dots 1208, 1209, 1210, 1211 and 1212 are sample vertices. For the middle vertex 1210 (e.g., an i-th vertex), a centerline, a tangent line 1230, and a direction of motion are shown. Of each vertex on the outer edge (i.e., at the contour of the feature), a position and a layer thickness are the state variables. With redistributions, the normal and tangential vectors are obtained from the instantaneous positions of the outer edge BLo vertices 1208, 1209, 1210, 1211 and 1212.

The redistribution moves outer vertices (i.e., vertices on the outer edge BLo of the boundary layer) in the direction of the line between the neighboring outer edge vertices. If the normal directions would not change, inner edge vertices (i.e., vertices along the inner edge BLi) (not shown) would move in the direction of the line between the neighboring inner edge vertices. An additional change in layer thickness must by imposed to take the change in normal direction into account. When one outer vertex moves in the tangential direction, this causes the corresponding inner vertex and its nearest neighbors to move in the tangential direction of the corresponding outer vertices. The changes in layer thicknesses must be such that their direction of motion is in the tangential direction of these inner vertices. In an embodiment, the redistribution is achieved based on the following time scale equation below, wherein $\Delta x$ is a distance between consecutive vertices and $\lambda$ is spatial period of $2\Delta x$.

$$\tau(\lambda, \delta) = -\frac{\pi^4 \delta^3}{3\Delta x^4} \quad (18)$$

In an embodiment, the velocity in the inner normal direction should be zero to conserve the volume of the boundary liquid layer which results in the following equation:

$$\mathcal{U} \cdot \vec{e}_{y,i} = \mathcal{U}_{x,i}(\vec{e}_{x,o} \cdot \vec{e}_{y,i}) - \partial_t \delta(\vec{e}_{y,o} \cdot \vec{e}_{y,i}) = 0 \Rightarrow \partial_t \delta = \mathcal{U}_{x,i} \frac{\vec{e}_{x,o} \cdot \vec{e}_{y,i}}{\vec{e}_{y,o} \cdot \vec{e}_{y,i}} \quad (19)$$

In the above equation, $\mathcal{U}_{x,i}$ is the outer tangential velocity of the inner vertex; $\vec{e}_{x,o}$ refers to outer tangential direction; $\vec{e}_{y,i}$ refers to inner normal direction; and $\vec{e}_{y,o}$ refers to outer normal direction. The above equation 19, gives the time rate of change of the layer thickness that conserves the volume of the boundary liquid layer, under redistribution of vertices. This time rate of change of the layer thickness conserves the volume when the outer vertices move in the outer tangential direction. It should be added to the time rate of change of the layer thickness due to flow, which causes the outer vertices to move in the outer normal direction.

Furthermore, when a neighboring outer vertex moves, this changes the normal direction. The time derivative of the normal vector depends on the velocity of the neighboring vertex and on the distance between the neighboring vertices. This is because the neighboring vertices determine the tangential direction. Now that the normal vectors can change during the simulation, the normal vector should be accounted for in change due to flow. The flow of material causes a component of the velocity of an outer vertex in the outer normal direction. This changes the normal direction of the neighboring vertices, which changes the inner tangential velocity.

The end of redistribution process results in the first displacement component due to the horizontal flow of the boundary layer. Further, the first displacement component is adjusted to include the second displacement due to the vertical flow of the fluid flow.

In an embodiment, the vertical flow component of the fluid flow of the boundary layer (e.g., 930) can be determined as follow. The calculation of the vertical flow is (for modelling purposes assumed to be) independent of the horizontal flow. Thus, in an embodiment, deformation due to only horizontal flow, only due to vertical flow may, or a combination thereof may be determined. In an embodiment, the vertical flow component results in an additional component of the time derivative of the layer thickness, which is used to determine deformation of the boundary layer. The deformation is calculated in the lubrication approximation, where vertical shear stress is neglected. Vertical shear stress is negligible if the deformation changes only gradually in the horizontal direction, over distances much longer than the layer thickness.

Figure 12B:
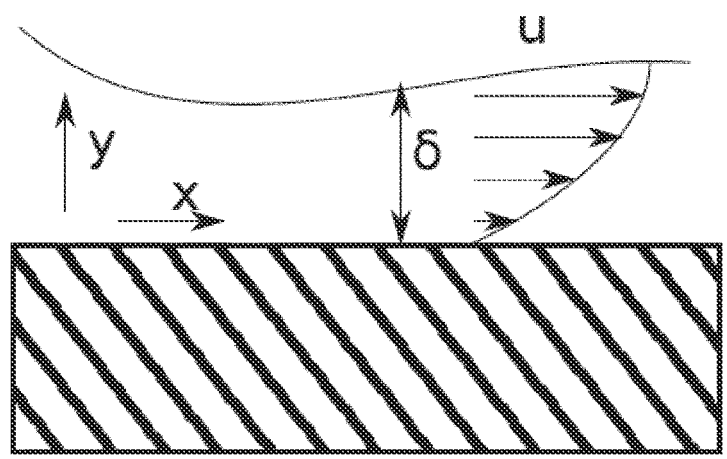
FIG. 12B illustrates example symbols used in a vertical flow determination of the boundary layer of FIG. 10C, according to the present disclosure.

In an embodiment, the vertical flow is determined based on a resist shrinkage model. FIG. 12B illustrates example nomenclatures used to define the vertical flow of the resist deformation model and the shrinkage model is defined as follows:

$$\partial_t \delta = \dot{\delta}_h + \frac{\kappa \pi^3}{8h^3} \sin\frac{\pi y}{2h} \quad (20)$$

In the above equation and referring to FIG. 12B, y is the coordinate in the normal direction, i.e., the distance from the solid surface of the feature; x is the tangential coordinate; $\dot{\delta}_h$ is the time derivative of the layer thickness due to horizontal flow, $\delta$ is the layer thickness, $\kappa$ is the volumetric shrinkage; and h is the height of the feature.

To calculate the vertical flow, extract the shape of the sides (e.g., as shown in Figure from the input pattern information and apply the resist deformation model due to shrinkage based on the lubrication approximation. Further, it is assumed that the deformation is incompressible. In an embodiment, the deformation is 2-dimensional deformation, which would be a good approximation for the deformation of, for example, a line feature. However, the present formulation is not limited to a particular shape of the feature, and can be extended for any feature shape.

The resist deformation model in vertical flow determination is based on a formulation where the divergence of the stress $\tau_{i,j}$ vanishes in material of the feature, since no body forces act on the material. All forces act on the boundaries. Accordingly, an elasticity formulation that describes displacements in a boundary liquid layer, where stresses and strains are eliminated from formulation may be employed. For example, a linear elasticity formulation defined by Navier-Cauchy equation may be employed along with the above assumptions to determine how the boundary liquid layer deforms due to the vertical flow.

In an embodiment, the Navier equation is used to obtain the governing equation in terms of a horizontal displacement (in x-direction) only, given as follows:

$$2\partial_x^2 u_x + \partial_y^2 u_x = 0 \quad (21)$$

Figure 13:
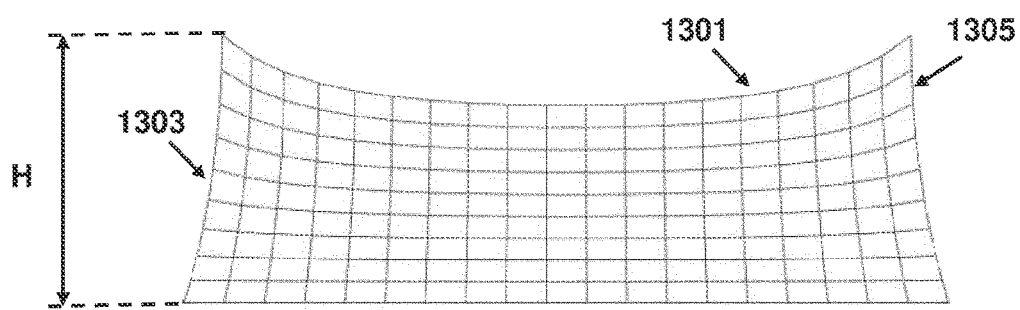
FIG. 13 illustrates example cross-section after shrinkage due to the vertical flow, according to the present disclosure.

Further to the above equation, in an embodiment, the boundary condition at the top, y=δ, is that the stress should vanish since there is no material beyond the feature edge to pull on. And the boundary condition at the bottom, y=0, is that the displacement should vanish. An example of a deformed shape of the cross-section of the resist in vertical plane is shown in FIG. 13. In FIG. 13, the edges 1301, 1303 and 1305 are away from the resist and deformed due to the vertical flow as discussed above. It can be seen that the edge at the solid portion or the resist is not deformed, as per the boundary condition.

Figure 14A:
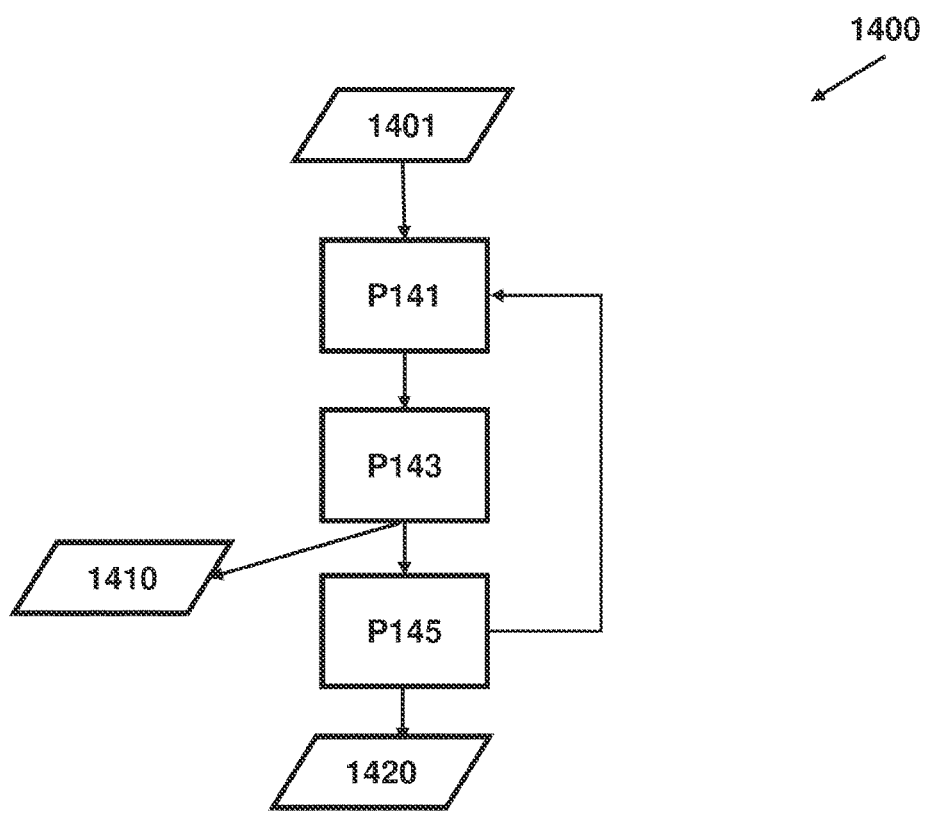
FIG. 14A is flow chart of a method for determining a deformation of a pattern to be developed using a boundary layer based resist deformation model, according to the present disclosure.

FIG. 14A is a flow chart of example method 1400 for determining, based on a thin-film based fluid model simplified according to the lubrication approximation, a deformation of a pattern to be formed in resist during a patterning process. In an embodiment, a first deformation of the feature is simulated based on the fluid flow in a first plane (e.g., a horizontal flow). Further, based on a fluid flow in a second plane (e.g., vertical plane), the first deformation is further deformed (referred to as a second deformation) to account for the vertical flow as discussed earlier. The result is a deformation of the pattern that accounts for deformations due to both horizontal flow and the vertical flow.

The method 1400, in process P141, involves inputting, into a resist deformation model, pattern information 1401 relating to the pattern to be formed, the model configured to simulate deformation of a portion of a resist, the portion comprising a boundary liquid layer (e.g., 930 in FIG. 10O) located at a boundary between a developed region in the resist and a region of the resist surrounding the developed region.

In an embodiment, pattern information 1401 is in form of an image comprising a contour(s) of a feature(s) as input. In an embodiment, the contours are extracted (e.g., in 320) from an aerial image (e.g., in 310) as discussed with respect to FIGS. 3B and 3C above. The extracted contours can be a grey scale image or a binary image. In an embodiment, the extracted contour refers to points where the force due to surface tension will be applied.

Process P143 involves determining the first deformation 1410 based on the horizontal flow as discussed earlier. In an embodiment, the determining the deformation further includes defining a plurality of vertices (e.g., in FIGS. 12A and 15) along a contour of the developed or open region in the resist; determining a capillary force $\vec{F}_i$ at a given vertex along the contour; and redistributing of the vertices such that (i) a volume of the developed region in the resist is conserved, (ii) the redistribution should converge, and (iii) a volume of the boundary liquid layer is conserved. An example redistribution process is described earlier as related to the horizontal flow and FIG. 12A.

Figure 14B:
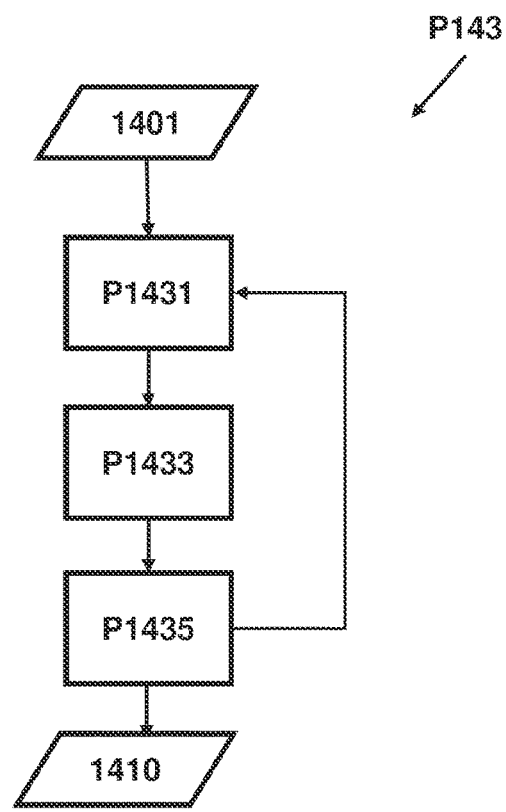
FIG. 14B is an example flow chart of a method for determining a deformation due to a horizontal flow of the boundary layer, according to the present disclosure.

For example, determining deformation due to horizontal flow involves determining forces $\vec{F}_i$ at each vertex of the boundary layer (the contour of the feature), a velocity and flow rate at each vertex of the contour, and redistribution of the vertices to obtain the first displacement of the vertices on the boundary layer at the developed region (i.e., the contour of the feature), of the vertices at an edge (at the resist) opposite to the developed region. FIG. 14B is an example flow chart of method for determining deformation 1410 based on the horizontal flow.

In FIG. 14B, the process of determining the first deformation using the pattern information 1401 is an iterative process involving processes P1431, P1433, P1435, and P1437. Process P1431 involves determining force $\vec{F}_i$ at a vertex of the plurality of vertices using, e.g., equations 3-5 as discussed earlier. The force $\vec{F}_i$ at the vertex is further used to compute pressure $\vec{P}_i$ at the vertex using, e.g., equation 12 as discussed above. Further, process P1433 involves determining velocity and flow rate based on a pressure gradient and the layer thickness. From the pressure in equation 12, the pressure gradient at a vertex is determined and is further used to determine the velocity as discussed with respect to equations 13-16. Based on the velocity, the flow rate from one vertex to another can be determined using equation 17, as discussed above. Process P1435 involves redistributing the plurality of vertices based on a time scale, e.g., as defined by equation 18, and the three specification (i) conserve the total volume of the feature, (ii) the redistribution should converge, and (iii) the volume of the boundary liquid layer should be conserved, as discussed above. The redistribution involves determining a time scale based on the horizontal component of the flow rate of the boundary liquid layer, and moving, based on the time scale, the vertices.

Furthermore, process P1437 involves determining the first deformation 1410 using, for example, the time derivative of the flow rate (e.g., equation 17). In an embodiment, the process P143 also involves determining a rate of change of thickness (e.g., $d_t \delta = (Q_{i+1/2} - Q_{i-1/2})/r_{ci}$) of the boundary liquid layer based on the flow rate of the boundary layer; and adjusting, based on the redistributed vertices (e.g., 1521 in FIG. 15), another plurality of vertices (e.g., 1522 in FIG. 15) along the free surface based on the rate of change of thickness of the boundary liquid layer.

The deformation 1410 due to the horizontal flow is adjusted based on the vertical flow, in process P145. The process P145 involves determining the second deformation 1420 based on the vertical flow, e.g., employing equations 20 and 21, as discussed earlier. The computation of the vertical flow is independent of the horizontal flow. In an embodiment, the second deformation is determined using a shrinkage model comprising a time derivative of the layer thickness (e.g., 1410) due to horizontal flow and a height of the feature with respect to substrate. The governing equation is such that the divergence of the stress is zero. Further, the lubrication approximation is employed, where vertical shear stress is neglected. The assumptions lead to a simplified version of Navier equation (e.g., equation 21) based on which a velocity and the deformation 1420 of the boundary liquid layer and the feature associated therewith may be determined.

Figure 15:
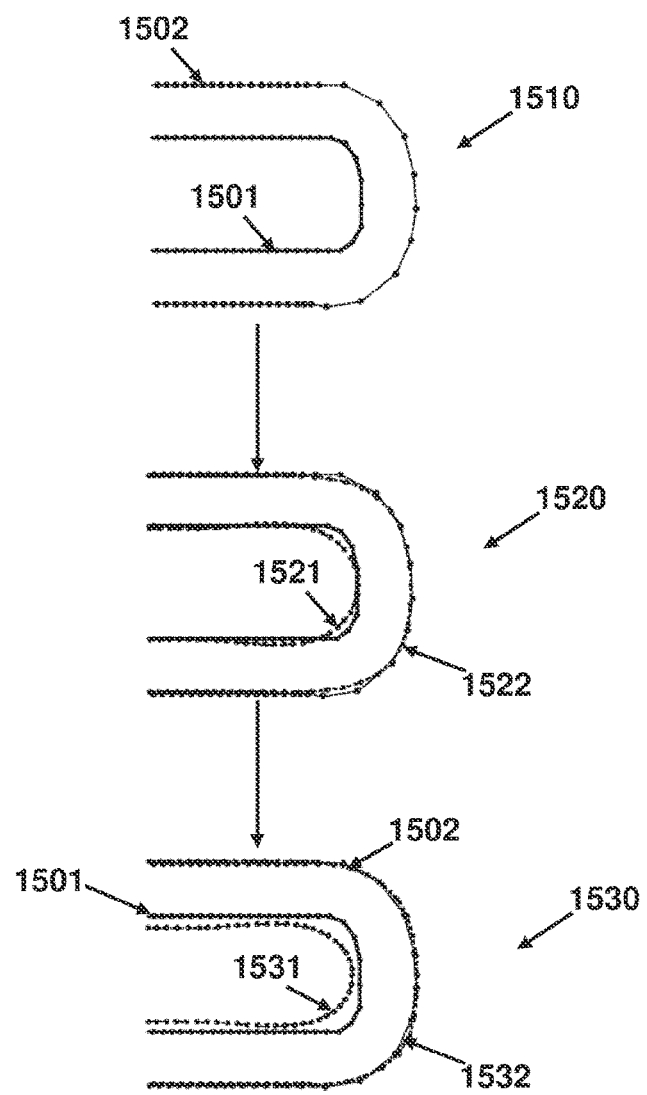
FIG. 15 illustrates example deformation based on the resist model used in method of FIG. 14A.

FIG. 15 illustrates an example of deformation of an input contour 1501 (e.g., extracted from an aerial image, as discussed earlier) based on the resist deformation model (e.g., based on thin-layer with lubrication approximation). In FIG. 15, the input contour 1501 is further surrounded by another contour 1502 at a width 6, thereby forming a boundary liquid layer 1510 having the width 6. Thus, in regards to employing the resist deformation model discussed above, the contour 1501 serves as a contour at the feature and the another contour 1502 serves a contour away from the feature (i.e., at the resist which is assumed as solid). Further, a plurality of vertices are defined on the contours 1501 and 1502 and the deformation of the boundary layer is determined with respect to the plurality of vertices. In an embodiment, the plurality of vertices on the contour 1501 moves according to the velocity and the fluid flow equations discussed above, and further based on the pressure gradient across the boundary layer and the width of the boundary layer, the movement of another plurality of vertices of the another contour 1502 is determined.

In an embodiment, the deformation of the vertices along the contour 1501 is determined based on the horizontal flow formulation, as discussed above, for example in method 1400, particularly process P143. Applying the formulation as discussed in process P143 results in a first deformation 1521 and 1521 of the contours 1501 and 1502, respectively. Thus, the deformed boundary layer 1520 due to the horizontal flow is obtained.

Further, the deformation of the vertices on the deformed contour 1521 and 1522 is determined based on the vertical flow formulation, for example, as discussed in process P145 above. Applying the vertical flow formulation results in deformed contours 1531 and 1532, as shown. Thus, the final deformed boundary layer 1530 that accounts for deformation due to the vertical flow is obtained.

In an embodiment, there is provided a method for determining a deformation of a resist in a patterning process. The method includes obtaining a resist deformation model of a resist having a pattern, the resist deformation model configured to simulate a fluid flow of the resist due to capillary forces acting on a contour of at least one feature of the pattern; and determining, via a processor and the resist deformation model, a deformation of a resist pattern to be developed based on an input pattern to the resist deformation model.

In an embodiment, the resist deformation model is based on a linearized Navier-Stokes flow equations.

In an embodiment, the fluid flow is characterized by a Stokes flow, and/or a Hele-Shaw flow.

In an embodiment, the fluid flow is characterized by a fundamental solution that decays with distance to a particular location in the resist at least as fast as $1/R$, and that is either regular in the resist or only singular at the location in the resist.

In an embodiment, determining the deformation involves defining a plurality of vertices along the contour of the at least one feature; determining a capillary force at a given vertex along the contour of the at least one feature; and determining a velocity flow field of the fluid flow due to the capillary force based on a superposition of a velocity response at one or more of the plurality of the vertices of the vertices along the contour of the at least one feature, and a boundary condition, where the velocity response is due to the capillary force acting at a vertex adjacent to the given vertex.

In an embodiment, the defining the plurality of vertices includes distributing the plurality of vertices to make them evenly spaced while conserving an area or a volume of the contour of the at least one feature.

In an embodiment, the capillary force acting on the given vertex is a sum of tensions on either side of the given vertex.

In an embodiment, the velocity response is characterized by Stokeslet, wherein a Stokeslet is the velocity field due to a point force in a Stokes flow.

In an embodiment, the determining the velocity flow field further involves decomposing the velocity field into a squeeze flow and a higher order velocity flow; applying a boundary condition corresponding to the squeeze flow; and removing the squeeze flow from the velocity field based on the boundary condition.

In an embodiment, the squeeze flow is a flow of resist due to a net inward flux or a net outward flux through the vertical domain boundaries, causing a large scale migration of the features.

In an embodiment, applying the boundary condition involves setting a flow rate through the boundary of a resist domain to zero; and/or setting a velocity across the boundary of the resist domain to no-flux condition.

In an embodiment, the total inward flow rate through the vertical domain boundaries is set to zero by providing a rotlet of appropriate strength at one or more corners of a boundary of the resist domain.

In an embodiment, the rotlets of equal magnitude and alternating signs when traversing the domain boundary, at are placed at the four corners of the rectangular resist domain. In an embodiment, determining a velocity flow field further involves obtaining velocity at the given vertex along the contour of the at least one feature based on velocities of all other vertices caused due to the capillary force at each of the other vertices by multiplication with Stokeslets.

In an embodiment, contributions to the velocity flow field due to features far away from the given vertex are negligible.

In an embodiment, the method further includes determining forces at a partial area within the resist; and obtaining a deformation of the entire area of the resist based on the simulation of the resist deformation model using forces at the partial area.

In an embodiment, the input pattern is a grayscale image and/or a binary image. In an embodiment, the input pattern is a design pattern or an aerial image.

In an embodiment, the method further comprising generating the binary image, the generating involves obtaining a patterning device pattern corresponding to the input pattern; producing, via simulation of a process model, an aerial image based on the patterning device pattern; and extracting boundaries of the pattern in the aerial image to generate the binary image.

In an embodiment, the method further involves computing, using the resist deformation model, a critical dimension between a pair of locations disposed on a boundary of the at least one feature in the developed resist pattern; and calculating an error between the computed critical dimension and a measured critical dimension of an actual developed resist pattern.

In an embodiment, the calculating the error comprises comparing, using a cross-correlation matrix between a printed wafer data and a simulated images.

In an embodiment, the deformation is determined at a plurality of locations, each location corresponding to a point that lies on a boundary of a developed portion of the developed resist pattern for the input pattern.

In an embodiment, the resist is a negative tone resist or a positive tone resist, chemically or not-chemically amplified.

In an embodiment, there is provided a method for determining a parameter of a patterning process, the method involves obtaining (i) a patterning process model that includes a resist deformation model of a resist having a pattern, the resist deformation model configured to simulate a fluid flow of the resist due to capillary forces acting on a contour of at least one feature of the pattern, and (ii) a target pattern; determining, via a processor, a resist pattern based on a simulation of the patterning process model with the target pattern as an input to the patterning process model, wherein a difference exists between the resist pattern and the target pattern; and determining, via the processor, a value of a parameter of the patterning process based on the simulation of the patterning process, the value of the parameter being determined such that the difference between the resist pattern and the target pattern is reduced.

In an embodiment, the parameter of the patterning process comprises at least one of dose, focus, and optical proximity correction.

In an embodiment, the method further involves applying the value of the parameter of the patterning process to a lithographic apparatus during the patterning process.

In an embodiment, there is provided a method for determining a deformation of a pattern to be formed in a patterning process. The method involves inputting, into a resist deformation model, pattern information relating to the pattern to be formed, the model configured to simulate deformation of a portion of a resist, the portion comprising a boundary liquid layer located at a boundary between a developed region in the resist and a region of the resist surrounding the developed region, where the model is configured to determine a first deformation component of the boundary liquid layer caused by fluid flow of the boundary liquid layer and a second deformation component of the boundary liquid layer caused by the fluid flow of the boundary liquid layer; and determining, via a processor, the deformation of the pattern to be formed in the resist based on the input pattern information, wherein the deformation comprises a combination of the first deformation component and the second deformation component of the boundary liquid layer.

In an embodiment, the boundary liquid layer has a thickness smaller than a length of the developed region in the resist at the boundary.

In an embodiment, the first deformation component is determined in a horizontal plane based on a horizontal component of a flow rate of the boundary liquid layer and the second deformation is determined in the horizontal plane based on a vertical component of the flow rate of the boundary liquid layer.

In an embodiment, the model has defined therein, a first boundary condition comprising a velocity gradient approximately equal to zero at a free surface of the boundary liquid layer, the free surface being opposite of the developed or open region.

In an embodiment, the model has defined therein, a second boundary condition comprising a velocity approximately equal to zero at a surface at the developed or open region.

In an embodiment, the model has defined therein, the velocity as a function of thickness of the boundary liquid layer and a pressure gradient across the thickness of the boundary liquid layer.

In an embodiment, the model has defined therein, the flow rate of the boundary liquid layer as a function of an integration of the velocity over the thickness of the boundary liquid layer.

In an embodiment, the model has defined therein, the deformation as a function of the flow rate of the boundary liquid layer.

In an embodiment, determining of the deformation involves determining the first deformation component in a first plane caused by the horizontal component of the flow rate of the boundary liquid layer; determining a final deformation in the first plane by adjusting the first deformation component based on the vertical component of the flow rate of the boundary liquid layer in a second plane, the second plane is perpendicular to the first plane.

In an embodiment, the first plane is the horizontal plane.

In an embodiment, the determining the deformation further involves defining a plurality of vertices along a contour of the developed or open region in the resist; determining a capillary force at a given vertex along the contour; and redistribution of the vertices such that (i) a volume of the developed region in the resist is conserved, and (ii) a volume of the boundary liquid layer conservation.

In an embodiment, the redistribution of the vertices involves determining a time scale based on the horizontal component of the flow rate of the boundary liquid layer, and moving, based on the time scale and the flow rate of the boundary layer, the plurality of vertices.

In an embodiment, the method further involves determining a rate of change of thickness of the boundary liquid layer based on the flow rate of the boundary layer; and adjusting, based on the redistributed vertices, another plurality of vertices along the free surface based on rate of change of thickness of the boundary liquid layer.

In an embodiment, the model is a thin-film model simplified based on lubrication approximation, wherein the lubrication approximation comprises a vertical shear stress value of zero.

Furthermore, there is provided a method for determining a deformation of a pattern to be formed in a patterning process. The method includes inputting, into a resist deformation model, pattern information relating to the pattern to be formed, the model configured to simulate deformation of a portion of a resist, the portion comprising a boundary liquid layer located at a boundary between a developed region in the resist and a region of the resist surrounding the developed region, wherein the model is configured to determine a deformation of the boundary liquid layer caused by a horizontal fluid flow of the boundary liquid layer; and determining (e.g., in the process P143), the deformation of the pattern to be formed in the resist by simulating the resist deformation model based on the input pattern information. The boundary liquid layer has a thickness smaller than a length of the developed region in the resist at the boundary.

In an embodiment, there is provided a non-transitory computer program product comprising machine-readable instructions for causing a processor to cause performance of the aforementioned methods.

Figure 16:
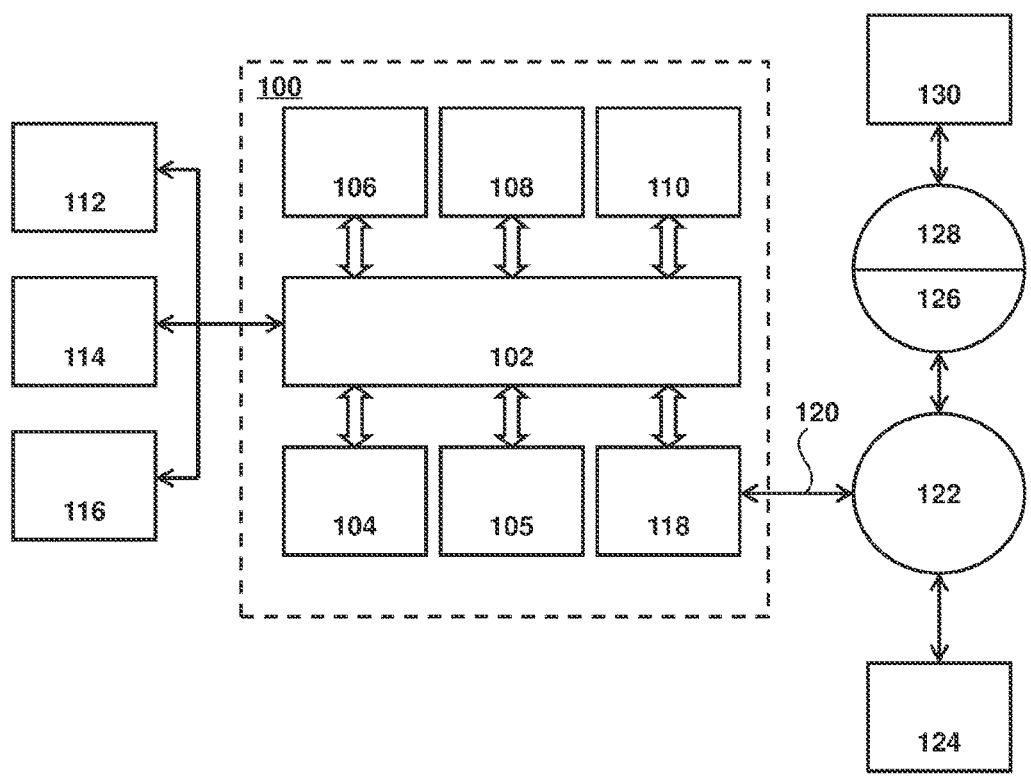
FIG. 16 is a block diagram of an example computer system, according to an embodiment.

FIG. 16 is a block diagram that illustrates a computer system 100 which perform one or more aspects of the methods and flows disclosed herein. Computer system 100 includes a bus 102 or other communication mechanism for communicating information, and a processor 104 (or multiple processors 104 and 105) coupled with bus 102 for processing information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT) or flat panel or touch panel display for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane. A touch panel (screen) display may also be used as an input device.

According to one embodiment, portions of a process described herein may be performed by computer system 100 in response to processor 104 executing one or more sequences of one or more instructions contained in main memory 106. Such instructions may be read into main memory 106 from another computer-readable medium, such as storage device 110. Execution of the sequences of instructions contained in main memory 106 causes processor 104 to perform the process steps described herein. One or more processors in a multi-processing arrangement may also be employed to execute the sequences of instructions contained in main memory 106. In an alternative embodiment, hard-wired circuitry may be used in place of or in combination with software instructions. Thus, the description herein is not limited to any specific combination of hardware circuitry and software.

The term "computer-readable medium" as used herein refers to any medium that participates in providing instructions to processor 104 for execution. Such a medium may take many forms, including but not limited to, non-volatile media, volatile media, and transmission media. Non-volatile media include, for example, optical or magnetic disks, such as storage device 110. Volatile media include dynamic memory, such as main memory 106. Transmission media include coaxial cables, copper wire and fiber optics, including the wires that comprise bus 102. Transmission media can also take the form of acoustic or light waves, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 104 for execution. For example, the instructions may initially be borne on a magnetic disk of a remote computer. The remote computer can load the instructions into its dynamic memory and send the instructions over a telephone line using a modem. A modem local to computer system 100 can receive the data on the telephone line and use an infrared transmitter to convert the data to an infrared signal. An infrared detector coupled to bus 102 can receive the data carried in the infrared signal and place the data on bus 102. Bus 102 carries the data to main memory 106, from which processor 104 retrieves and executes the instructions. The instructions received by main memory 106 may optionally be stored on storage device 110 either before or after execution by processor 104.

Computer system 100 also preferably includes a communication interface 118 coupled to bus 102. Communication interface 118 provides a two-way data communication coupling to a network link 120 that is connected to a local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the worldwide packet data communication network, now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120, and communication interface 118. In the Internet example, a server 130 might transmit a requested code for an application program through Internet 128, ISP 126, local network 122 and communication interface 118. One such downloaded application may provide for a process as described herein, for example. The received code may be executed by processor 104 as it is received, and/or stored in storage device 110, or other non-volatile storage for later execution. In this manner, computer system 100 may obtain application code in the form of a carrier wave.

Figure 17:
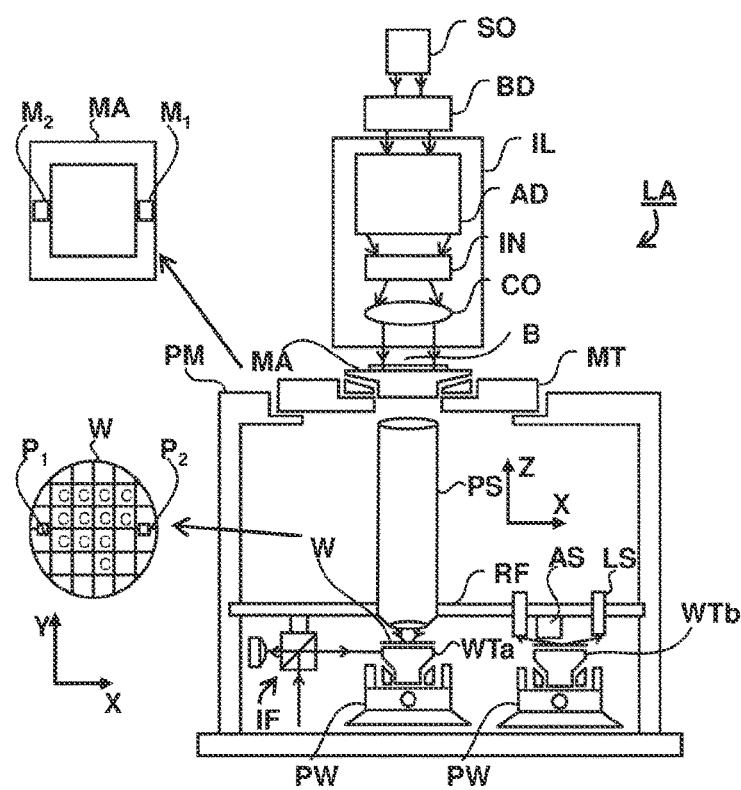
FIG. 17 is a schematic diagram of a lithography projection apparatus, according to an embodiment.

FIG. 17 schematically depicts an exemplary lithographic projection apparatus for use with the methods described herein. The apparatus comprises:
- an illumination system IL, to condition a beam B of radiation. In this particular case, the illumination system also comprises a radiation source SO;
- a first object table (e.g., mask table) MT provided with a patterning device holder to hold a patterning device MA (e.g., a reticle), and connected to a first positioner to accurately position the patterning device with respect to item PS;
- a second object table (substrate table) WT provided with a substrate holder to hold a substrate W (e.g., a resist-coated silicon wafer), and connected to a second positioner to accurately position the substrate with respect to item PS;
- a projection system ("lens") PS (e.g., a refractive, catoptric or catadioptric optical system) to image an irradiated portion of the patterning device MA onto a target portion C (e.g., comprising one or more dies) of the substrate W.

As depicted herein, the apparatus is of a transmissive type (i.e., has a transmissive mask). However, in general, it may also be of a reflective type, for example (with a reflective mask). Alternatively, the apparatus may employ another kind of patterning device as an alternative to the use of a classic mask; examples include a programmable mirror array or LCD matrix.

The source SO (e.g., a mercury lamp or excimer laser) produces a beam of radiation. This beam is fed into an illumination system (illuminator) IL, either directly or after having traversed conditioning means, such as a beam expander Ex, for example. The illuminator IL may comprise adjusting means AD for setting the outer and/or inner radial extent (commonly referred to as σ-outer and σ-inner, respectively) of the intensity distribution in the beam. In addition, it will generally comprise various other components, such as an integrator IN and a condenser CO. In this way, the beam B impinging on the patterning device MA has a desired uniformity and intensity distribution in its cross-section.

It should be noted with regard to FIG. 17 that the source SO may be within the housing of the lithographic projection apparatus (as is often the case when the source SO is a mercury lamp, for example), but that it may also be remote from the lithographic projection apparatus, the radiation beam that it produces being led into the apparatus (e.g., with the aid of suitable directing mirrors); this latter scenario is often the case when the source SO is an excimer laser (e.g., based on KrF, ArF or $F_2$ lasing).

The beam PB subsequently intercepts the patterning device MA, which is held on a patterning device table MT. Having traversed the patterning device MA, the beam B passes through the lens PL, which focuses the beam B onto a target portion C of the substrate W. With the aid of the second positioning means (and interferometric measuring means IF), the substrate table WT can be moved accurately, e.g. so as to position different target portions C in the path of the beam PB. Similarly, the first positioning means can be used to accurately position the patterning device MA with respect to the path of the beam B, e.g., after mechanical retrieval of the patterning device MA from a patterning device library, or during a scan. In general, movement of the object tables MT, WT will be realized with the aid of a long-stroke module (coarse positioning) and a short-stroke module (fine positioning), which are not explicitly depicted in FIG. 17. However, in the case of a wafer stepper (as opposed to a step-and-scan tool) the patterning device table MT may just be connected to a short stroke actuator, or may be fixed.

The depicted tool can be used in two different modes:

In step mode, the patterning device table MT is kept essentially stationary, and an entire patterning device image is projected in one go (i.e., a single "flash") onto a target portion C. The substrate table WT is then shifted in the x and/or y directions so that a different target portion C can be irradiated by the beam PB;

In scan mode, essentially the same scenario applies, except that a given target portion C is not exposed in a single "flash". Instead, the patterning device table MT is movable in a given direction (the so-called "scan direction", e.g., the y direction) with a speed v, so that the projection beam B is caused to scan over a patterning device image; concurrently, the substrate table WT is simultaneously moved in the same or opposite direction at a speed V=Mv, in which M is the magnification of the lens PL (typically, M=1/4 or 1/5). In this manner, a relatively large target portion C can be exposed, without having to compromise on resolution.

Figure 18:
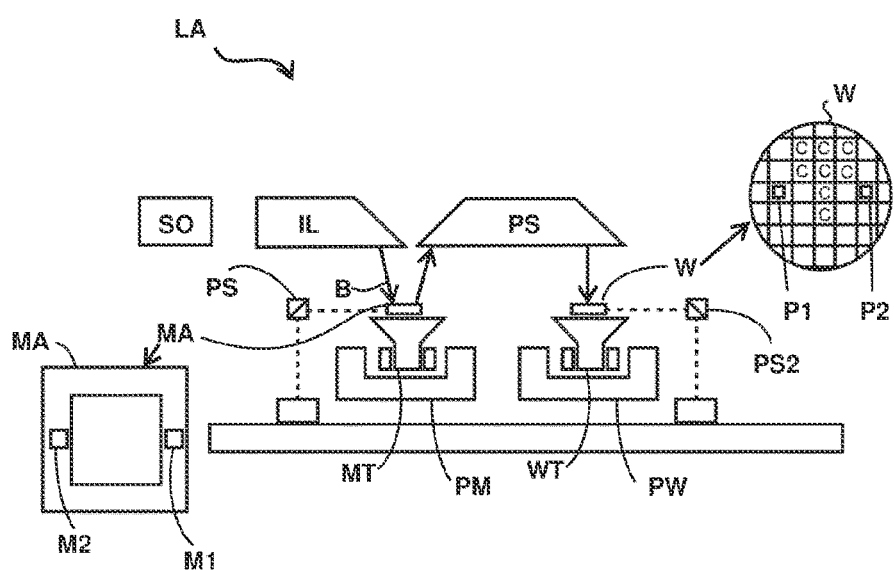
FIG. 18 is a schematic diagram of another lithography projection apparatus, according to an embodiment.

FIG. 18 schematically depicts another exemplary lithographic projection apparatus 1000 that can be used for the methods described herein.

The lithographic projection apparatus 1000 includes:

a source collector module SO an illumination system (illuminator) IL configured to condition a radiation beam B (e.g. EUV radiation).

a support structure (e.g. a mask table) MT constructed to support a patterning device (e.g. a mask or a reticle) MA and connected to a first positioner PM configured to accurately position the patterning device;

a substrate table (e.g. a wafer table) WT constructed to hold a substrate (e.g. a resist coated wafer) W and connected to a second positioner PW configured to accurately position the substrate; and a projection system (e.g. a reflective projection system) PS configured to project a pattern imparted to the radiation beam B by patterning device MA onto a target portion C (e.g. comprising one or more dies) of the substrate W.

As here depicted, the apparatus 1000 is of a reflective type (e.g. employing a reflective mask). It is to be noted that because most materials are absorptive within the EUV wavelength range, the mask may have multilayer reflectors comprising, for example, a multi-stack of molybdenum and silicon. In one example, the multi-stack reflector has a 40 layer pairs of molybdenum and silicon where the thickness of each layer is a quarter wavelength. Even smaller wavelengths may be produced with X-ray lithography. Since most material is absorptive at EUV and x-ray wavelengths, a thin piece of patterned absorbing material on the patterning device topography (e.g., a TaN absorber on top of the multi-layer reflector) defines where features would print (positive resist) or not print (negative resist).

Referring to FIG. 18, the illuminator IL receives an extreme ultra violet radiation beam from the source collector module SO. Methods to produce EUV radiation include, but are not necessarily limited to, converting a material into a plasma state that has at least one element, e.g., xenon, lithium or tin, with one or more emission lines in the EUV range. In one such method, often termed laser produced plasma ("LPP") the plasma can be produced by irradiating a fuel, such as a droplet, stream or cluster of material having the line-emitting element, with a laser beam. The source collector module SO may be part of an EUV radiation system including a laser, not shown in FIG. 18, for providing the laser beam exciting the fuel. The resulting plasma emits output radiation, e.g., EUV radiation, which is collected using a radiation collector, disposed in the source collector module. The laser and the source collector module may be separate entities, for example when a CO2 laser is used to provide the laser beam for fuel excitation.

In such cases, the laser is not considered to form part of the lithographic apparatus and the radiation beam is passed from the laser to the source collector module with the aid of a beam delivery system comprising, for example, suitable directing mirrors and/or a beam expander. In other cases the source may be an integral part of the source collector module, for example when the source is a discharge produced plasma EUV generator, often termed as a DPP source.

The illuminator IL may comprise an adjuster for adjusting the angular intensity distribution of the radiation beam. Generally, at least the outer and/or inner radial extent (commonly referred to as σ-outer and σ-inner, respectively)

of the intensity distribution in a pupil plane of the illuminator can be adjusted. In addition, the illuminator IL may comprise various other components, such as faceted field and pupil mirror devices. The illuminator may be used to condition the radiation beam, to have a desired uniformity and intensity distribution in its cross section.

The radiation beam B is incident on the patterning device (e.g., mask) MA, which is held on the support structure (e.g., mask table) MT, and is patterned by the patterning device. After being reflected from the patterning device (e.g. mask) MA, the radiation beam B passes through the projection system PS, which focuses the beam onto a target portion C of the substrate W. With the aid of the second positioner PW and position sensor PS2 (e.g. an interferometric device, linear encoder or capacitive sensor), the substrate table WT can be moved accurately, e.g. so as to position different target portions C in the path of the radiation beam B. Similarly, the first positioner PM and another position sensor PS1 can be used to accurately position the patterning device (e.g. mask) MA with respect to the path of the radiation beam B. Patterning device (e.g. mask) MA and substrate W may be aligned using patterning device alignment marks M1, M2 and substrate alignment marks P1, P2.

The depicted apparatus 1000 could be used in at least one of the following modes:

1. In step mode, the support structure (e.g. mask table) MT and the substrate table WT are kept essentially stationary, while an entire pattern imparted to the radiation beam is projected onto a target portion C at one time (i.e. a single static exposure). The substrate table WT is then shifted in the X and/or Y direction so that a different target portion C can be exposed.

2. In scan mode, the support structure (e.g. mask table) MT and the substrate table WT are scanned synchronously while a pattern imparted to the radiation beam is projected onto a target portion C (i.e. a single dynamic exposure). The velocity and direction of the substrate table WT relative to the support structure (e.g. mask table) MT may be determined by the (de-) magnification and image reversal characteristics of the projection system PS.

3. In another mode, the support structure (e.g. mask table) MT is kept essentially stationary holding a programmable patterning device, and the substrate table WT is moved or scanned while a pattern imparted to the radiation beam is projected onto a target portion C. In this mode, generally a pulsed radiation source is employed and the programmable patterning device is updated as required after each movement of the substrate table WT or in between successive radiation pulses during a scan. This mode of operation can be readily applied to mask less lithography that utilizes programmable patterning device, such as a programmable mirror array of a type as referred to above.

Figure 19:
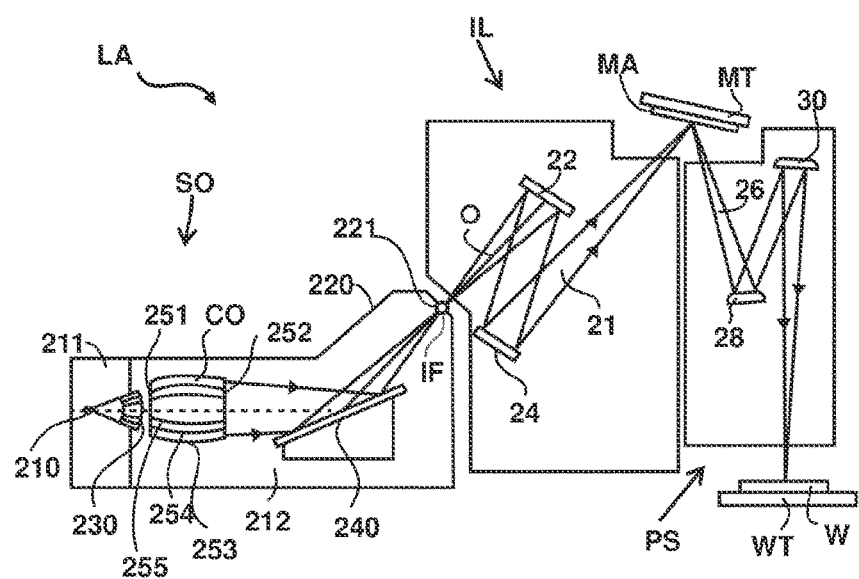
FIG. 19 is a more detailed view of the apparatus of FIG. 18, according to an embodiment.

FIG. 19 shows the apparatus 1000 in more detail, including the source collector module SO, the illumination system IL, and the projection system PS. The source collector module SO is constructed and arranged such that a vacuum environment can be maintained in an enclosing structure 220 of the source collector module SO. A EUV radiation emitting plasma 210 may be formed by a discharge produced plasma source. EUV radiation may be produced by a gas or vapor, for example Xe gas, Li vapor or Sn vapor in which the very hot plasma 210 is created to emit radiation in the EUV range of the electromagnetic spectrum. The very hot plasma 210 is created by, for example, an electrical discharge causing at least partially ionized plasma. Partial pressures of, for example, 10 Pa of Xe, Li, Sn vapor or any other suitable gas or vapor may be required for efficient generation of the radiation. In an embodiment, a plasma of excited tin (Sn) is provided to produce EUV radiation.

The radiation emitted by the hot plasma 210 is passed from a source chamber 211 into a collector chamber 212 via an optional gas barrier or contaminant trap 230 (in some cases also referred to as contaminant barrier or foil trap), which is positioned in or behind an opening in source chamber 211. The contaminant trap 230 may include a channel structure. Contamination trap 230 may also include a gas barrier or a combination of a gas barrier and a channel structure. The contaminant trap or contaminant barrier 230 further indicated herein at least includes a channel structure, as known in the art.

The collector chamber 211 may include a radiation collector CO which may be a so-called grazing incidence collector. Radiation collector CO has an upstream radiation collector side 251 and a downstream radiation collector side 252. Radiation that traverses collector CO can be reflected off a grating spectral filter 240 to be focused in a virtual source point IF along the optical axis indicated by the dot-dashed line 'O'. The virtual source point IF is commonly referred to as the intermediate focus, and the source collector module is arranged such that the intermediate focus IF is located at or near an opening 221 in the enclosing structure 220. The virtual source point IF is an image of the radiation emitting plasma 210.

Subsequently the radiation traverses the illumination system IL, which may include a facetted field mirror device 22 and a facetted pupil mirror device 24 arranged to provide a desired angular distribution of the radiation beam 21, at the patterning device MA, as well as a desired uniformity of radiation intensity at the patterning device MA. Upon reflection of the beam of radiation 21 at the patterning device MA, held by the support structure MT, a patterned beam 26 is formed and the patterned beam 26 is imaged by the projection system PS via reflective elements 28, 30 onto a substrate W held by the substrate table WT.

More elements than shown may generally be present in illumination optics unit IL and projection system PS. The grating spectral filter 240 may optionally be present, depending upon the type of lithographic apparatus. Further, there may be more mirrors present than those shown in the Figures, for example there may be 1-6 additional reflective elements present in the projection system PS than shown in FIG. 19.

Collector optic CO, as illustrated in FIG. 19, is depicted as a nested collector with grazing incidence reflectors 253, 254 and 255, just as an example of a collector (or collector mirror). The grazing incidence reflectors 253, 254 and 255 are disposed axially symmetric around the optical axis O and a collector optic CO of this type is preferably used in combination with a discharge produced plasma source, often called a DPP source.

Figure 20:
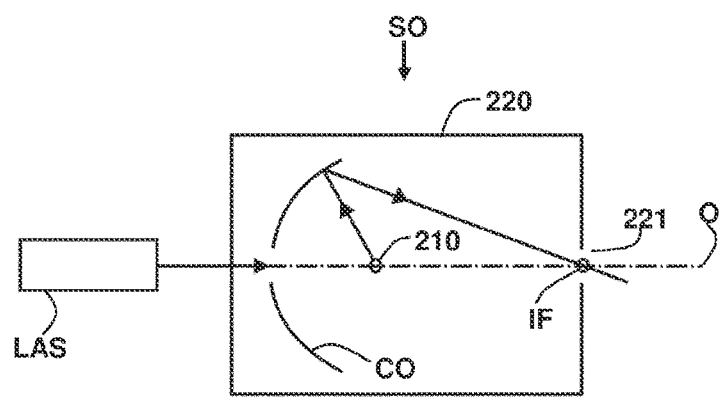
FIG. 20 is a more detailed view of the source collector module of the apparatus of FIG. 18 and FIG. 19, according to an embodiment.

Alternatively, the source collector module SO may be part of an LPP radiation system as shown in FIG. 20. A laser LA is arranged to deposit laser energy into a fuel, such as xenon (Xe), tin (Sn) or lithium (Li), creating the highly ionized plasma 210 with electron temperatures of several 10's of eV. The energetic radiation generated during de-excitation and recombination of these ions is emitted from the plasma, collected by a near normal incidence collector optic CO and focused onto the opening 221 in the enclosing structure 220.

The embodiments may further be described using the following clauses:

1. A method for determining a deformation of a resist in a patterning process, the method comprising:

obtaining a resist deformation model of a resist having a pattern, the resist deformation model configured to simulate a fluid flow of the resist due to capillary forces acting on a contour of at least one feature of the pattern; and determining, via a processor and the resist deformation model, a deformation of a resist pattern to be developed based on an input pattern to the resist deformation model.

2. The method of clause 1, wherein the resist deformation model is based on a linearized Navier-Stokes flow equations.

3. The method of clause 1 or clause 2, wherein the fluid flow is characterized by a Stokes flow, and/or a Hele-Shaw flow.

4. The method of clause 1 or clause 2, wherein the fluid flow is characterized by a fundamental solution that decays with distance to a particular location in the resist at least as fast as 1/R, and that is either regular in the resist or only singular at the location in the resist.

5. The method of any of clauses 1-4, determining the deformation comprises:
defining a plurality of vertices along the contour of the at least one feature;
determining a capillary force at a given vertex along the contour of the at least one feature; and
determining a velocity flow field of the fluid flow due to the capillary force based on a superposition of a velocity response at one or more of the plurality of the vertices of the vertices along the contour of the at least one feature, and a boundary condition, wherein the velocity response is due to the capillary force acting at a vertex adjacent to the given vertex.

6. The method of any of clause 5, wherein the defining the plurality of vertices comprises: distributing the plurality of vertices to make them evenly spaced while conserving an area or a volume of the contour of the at least one feature.

7. The method of any of clauses 1-6, wherein the capillary force acting on the given vertex is a sum of tensions on either side of the given vertex.

8. The method of clause 5, wherein the velocity response is characterized by Stokeslet, wherein a Stokeslet is the velocity field due to a point force in a Stokes flow.

9. The method of clause 5, wherein the determining the velocity flow field further comprises:
decomposing the velocity field into a squeeze flow and a higher order velocity flow;
applying a boundary condition corresponding to the squeeze flow; and
removing the squeeze flow from the velocity field based on the boundary condition.

10. The method of clause 9, wherein the squeeze flow is a flow of resist due to a net inward flux or a net outward flux through the resist domain boundaries, causing a large scale migration of the features.

11. The method of any of clauses 7-10, wherein applying the boundary condition comprises: setting a flow rate through the boundary of a resist domain to zero; and/or setting a velocity across the boundary of the resist domain to no-flux condition.

12. The method of clause 9, wherein the total inward flow rate through the resist domain boundaries is set to zero by providing a rotlet of appropriate strength at one or more corners of a boundary of the resist domain.

13. The method of clause 10, wherein the rotlets of equal magnitude and alternating signs when traversing the domain boundary, at are placed at the four corners of the rectangular resist domain.

14. The method of any of clauses 5-13, determining a velocity flow field further comprising: obtaining velocity at the given vertex along the contour of the at least one feature based on velocities of all other vertices caused due to the capillary force at each of the other vertices by multiplication with Stokeslets.

15. The method of clause 5, wherein contributions to the velocity flow field due to features far away from the given vertex are negligible.

16. The method of any of clauses 5-13, further comprising:
determining forces at a partial area within the resist; and
obtaining a deformation of the entire area of the resist based on the simulation of the resist deformation model using forces at the partial area.

17. The method of any of clauses 1-16, wherein the input pattern is a grayscale image and/or a binary image.

18. The method of any of clauses 1-17, wherein the input pattern is a design pattern, a resist image, a mask pattern, and/or an aerial image.

19. The method of clause 18, further comprising generating the binary image, the generating comprising:
obtaining a patterning device pattern corresponding to the input pattern;
producing, via simulation of a process model, an aerial image based on the patterning device pattern; and
extracting boundaries of the pattern in the aerial image to generate the binary image.

20. The method of any of clauses 1-19, further comprising:
computing, using the resist deformation model, a critical dimension between a pair of locations disposed on a boundary of the at least one feature in the developed resist pattern; and
calculating an error between the computed critical dimension and a measured critical dimension of an actual developed resist pattern.

21. The method of clause 20, wherein the calculating the error comprises comparing, using a cross-correlation matrix between a printed wafer data and a simulated images.

22. The method of any of clauses 1-21, wherein the deformation is determined at a plurality of locations, each location corresponding to a point that lies on a boundary of a developed portion of the developed resist pattern for the input pattern.

23. The method of any of clauses 1-22, wherein the resist is a negative tone resist or a positive tone resist, chemically or not-chemically amplified.

24. A method for determining a parameter of a patterning process, the method comprising:
obtaining (i) a patterning process model that includes a resist deformation model of a resist having a pattern, the resist deformation model configured to simulate a fluid flow of the resist due to capillary forces acting on a contour of at least one feature of the pattern, and (ii) a target pattern;
determining, via a processor, a resist pattern based on a simulation of the patterning process model with the target pattern as an input to the patterning process model, wherein a difference exists between the resist pattern and the target pattern; and
determining, via the processor, a value of a parameter of the patterning process based on the simulation of the patterning process, the value of the parameter being determined such that the difference between the resist pattern and the target pattern is reduced.

25. The method of clause 24, wherein the parameter of the patterning process comprises at least one of dose, focus, and optical proximity correction.

26. The method of any of clauses 24-25, further comprising applying the value of the parameter of the patterning process to a lithographic apparatus during the patterning process.

27. A method for determining a deformation of a pattern to be formed in a patterning process, the method comprising:
inputting, into a resist deformation model, pattern information relating to the pattern to be formed, the model configured to simulate deformation of a portion of a resist, the portion comprising a boundary liquid layer located at a boundary between a developed region in the resist and a region of the resist surrounding the developed region, wherein the model is configured to determine a first deformation component of the boundary liquid layer caused by fluid flow of the boundary liquid layer and a second deformation component of the boundary liquid layer caused by the fluid flow of the boundary liquid layer; and
determining, via a processor, the deformation of the pattern to be formed in the resist based on the input pattern information, wherein the deformation comprises a combination of the first deformation component and the second deformation component of the boundary liquid layer.

28. The method of clause 27, wherein the boundary liquid layer has a thickness smaller than a length of the developed region in the resist at the boundary.

29. The method of any of clauses 27-28, wherein the first deformation component is determined in a horizontal plane based on a horizontal component of a flow rate of the boundary liquid layer and the second deformation is determined in the horizontal plane based on a vertical component of the flow rate of the boundary liquid layer.

30. The method of any of clauses 27-29, wherein the model has defined therein, a first boundary condition comprising a velocity gradient approximately equal to zero at a free surface of the boundary liquid layer, the free surface being opposite of the developed or open region.

31. The method of any of clauses 27-30, wherein the model has defined therein, a second boundary condition comprising a velocity approximately equal to zero at a surface at the developed or open region.

32. The method of clause 31, wherein the model has defined therein, the velocity as a function of thickness of the boundary liquid layer and a pressure gradient across the thickness of the boundary liquid layer.

33. The method of clause 32, wherein the model has defined therein, the flow rate of the boundary liquid layer as a function of an integration of the velocity over the thickness of the boundary liquid layer.

34. The method of clause 29, wherein the model has defined therein, the deformation as a function of the flow rate of the boundary liquid layer.

35. The method of any of clauses 27-34, wherein determining of the deformation comprises:
determining the first deformation component in a first plane caused by the horizontal component of the flow rate of the boundary liquid layer; and
determining a final deformation in the first plane by adjusting the first deformation component based on the vertical component of the flow rate of the boundary liquid layer in a second plane, the second plane is perpendicular to the first plane.

36. The method of clause 35, wherein the first plane is the horizontal plane.

37. The method of any of clauses 27-36, wherein the determining the deformation further comprises:
defining a plurality of vertices along a contour of the developed or open region in the resist;
determining a capillary force at a given vertex along the contour; and
redistribution of the vertices such that (i) a volume of the developed region in the resist is conserved, and (ii) a volume of the boundary liquid layer conservation.

38. The method of clause 37, wherein the redistribution of the vertices comprises:
determining a time scale based on the horizontal component of the flow rate of the boundary liquid layer; and
moving, based on the time scale and the flow rate of the boundary layer, the plurality of vertices.

39. The method of clause 38, further comprising:
determining a rate of change of thickness of the boundary liquid layer based on the flow rate of the boundary liquid layer; and
adjusting, based on the redistributed vertices, another plurality of vertices along the free surface based on rate of change of thickness of the boundary liquid layer.

40. The method of any of clauses 27-39, wherein the model is a thin-film model simplified based on lubrication approximation, wherein the lubrication approximation comprises a vertical shear stress value of zero.

41. A method for determining a deformation of a pattern to be formed in a patterning process, the method comprising:
inputting, into a resist deformation model, pattern information relating to the pattern to be formed, the model configured to simulate deformation of a portion of a resist, the portion comprising a boundary liquid layer located at a boundary between a developed region in the resist and a region of the resist surrounding the developed region, wherein the model is configured to determine a deformation of the boundary liquid layer caused by a horizontal fluid flow of the boundary liquid layer; and
determining, via a processor, the deformation of the pattern to be formed in the resist by simulating the resist deformation model based on the input pattern information.

42. The method of clause 41, wherein the boundary liquid layer has a thickness smaller than a length of the developed region in the resist at the boundary.

43. A non-transitory computer program product comprising machine-readable instructions for causing a processor to cause performance of the method of any of clauses 1-42.

Although specific reference may be made in this text to the manufacture of devices such as ICs, it should be explicitly understood that the description herein has many other possible applications. For example, it may be employed in the manufacture of integrated optical systems, guidance and detection patterns for magnetic domain memories, liquid-crystal display panels, thin-film magnetic heads, etc. The skilled artisan will appreciate that, in the context of such alternative applications, any use of the terms "reticle", "wafer" or "die" in this text should be considered as interchangeable with the more general terms "mask", "substrate" and "target portion", respectively.

It is noted that the terms "mask", "reticle", and "patterning device" are utilized interchangeably herein. Also, a person skilled in the art will recognize that, especially in the context of lithography simulation/optimization, the term "mask"/"patterning device" and "design layout" can be used interchangeably, as in lithography simulation/optimization, a physical patterning device is not necessarily used but a design layout can be used to represent a physical patterning device.

In the present document, the terms "radiation" and "beam" are used to encompass all types of electromagnetic radiation, including ultraviolet radiation (e.g. with a wavelength of 365, 248, 193, 157 or 126 nm) and extreme ultra-violet radiation (EUV), e.g. having a wavelength in the range 5-20 nm).

The terms "optimizing" and "optimization" as used herein mean adjusting a lithographic projection apparatus and/or a patterning process such that results and/or processes of the patterning process (such as lithography) have a more desirable characteristic, such as higher accuracy of projection of design layouts on a substrate, a larger process window, etc. The terms "optimizing" and "optimization" do not necessarily require that results and/or processes of lithography have the most desirable characteristics, such as highest accuracy of projection of design layouts on a substrate, largest process window, etc.

The patterning device referred to above comprises or can form design layouts. The design layouts can be generated utilizing CAD (computer-aided design) programs, this process often being referred to as EDA (electronic design automation). Most CAD programs follow a set of predetermined design rules in order to create functional design layouts/patterning devices. These rules are set by processing and design limitations. For example, design rules define the space tolerance between circuit devices (such as gates, capacitors, etc.) or interconnect lines, so as to ensure that the circuit devices or lines do not interact with one another in an undesirable way. The design rule limitations are typically referred to as "critical dimensions" (CD). A critical dimension of a circuit can be defined as the smallest width of a line or hole or the smallest space between two lines or two holes. Thus, the CD determines the overall size and density of the designed circuit. Of course, one of the goals in integrated circuit fabrication is to faithfully reproduce the original circuit design on the substrate (via the patterning device).

The term "mask" or "patterning device" as employed in this text may be broadly interpreted as referring to a generic patterning device that can be used to endow an incoming radiation beam with a patterned cross-section, corresponding to a pattern that is to be created in a target portion of the substrate; the term "light valve" can also be used in this context. Besides the classic mask (transmissive or reflective; binary, phase-shifting, hybrid, etc.), examples of other such patterning devices include a programmable mirror array and/or a programmable LCD array.

The concepts disclosed herein may simulate or mathematically model any patterning process, and may be especially useful with imaging technologies capable of producing increasingly shorter wavelengths. Examples of such imaging technologies already in use include EUV (extreme ultra violet), DUV lithography that is capable of producing a 193 nm wavelength with the use of an ArF laser and/or a 157 nm wavelength with the use of a fluorine laser. Moreover, EUV lithography is capable of producing wavelengths within a range of about 5 nm to about 20 nm by using, e.g., a synchrotron or by hitting a material (either solid or a plasma) with high energy electrons in order to produce photons within this range.

While the concepts disclosed herein may be used for patterning processes involving imaging on a substrate such as a silicon wafer, it shall be understood that the disclosed concepts may be used with any type of lithographic systems, e.g., those used for imaging on substrates other than silicon wafers.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, third party content delivery networks may host some or all of the information conveyed over networks, in which case, to the extent information (e.g., content) is said to be supplied or otherwise provided, the information may be provided by sending instructions to retrieve that information from a content delivery network.

Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device.

The reader should appreciate that the present application describes several inventions. Rather than separating those inventions into multiple isolated patent applications, these inventions have been grouped into a single document because their related subject matter lends itself to economies in the application process. But the distinct advantages and aspects of such inventions should not be conflated. In some cases, embodiments address all of the deficiencies noted herein, but it should be understood that the inventions are independently useful, and some embodiments address only a subset of such problems or offer other, unmentioned benefits that will be apparent to those of skill in the art reviewing the present disclosure. Due to cost constraints, some inventions disclosed herein may not be presently claimed and may be claimed in later filings, such as continuation applications or by amending the present claims. Similarly, due to space constraints, neither the Abstract nor the Summary sections of the present document should be taken as containing a comprehensive listing of all such inventions or all aspects of such inventions.

It should be understood that the description and the drawings are not intended to limit the present disclosure to the particular form disclosed, but to the contrary, the intention is to cover all modifications, equivalents, and alternatives falling within the spirit and scope of the inventions as defined by the appended claims.

Modifications and alternative embodiments of various aspects of the inventions will be apparent to those skilled in the art in view of this description. Accordingly, this description and the drawings are to be construed as illustrative only and are for the purpose of teaching those skilled in the art the general manner of carrying out the inventions. It is to be understood that the forms of the inventions shown and described herein are to be taken as examples of embodiments. Elements and materials may be substituted for those illustrated and described herein, parts and processes may be reversed or omitted, certain features may be utilized independently, and embodiments or features of embodiments may be combined, all as would be apparent to one skilled in the art after having the benefit of this description. Changes may be made in the elements described herein without departing from the spirit and scope of the invention as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an" element or "a" element includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. References to selection from a range includes the end points of the range.

In the above description, any processes, descriptions or blocks in flowcharts should be understood as representing modules, segments or portions of code which include one or more executable instructions for implementing specific logical functions or steps in the process, and alternate implementations are included within the scope of the exemplary embodiments of the present advancements in which functions can be executed out of order from that shown or discussed, including substantially concurrently or in reverse order, depending upon the functionality involved, as would be understood by those skilled in the art.

While certain embodiments have been described, these embodiments have been presented by way of example only, and are not intended to limit the scope of the present disclosures. Indeed, the novel methods, apparatuses and systems described herein can be embodied in a variety of other forms; furthermore, various omissions, substitutions and changes in the form of the methods, apparatuses and systems described herein can be made without departing from the spirit of the present disclosures. The accompanying claims and their equivalents are intended to cover such forms or modifications as would fall within the scope and spirit of the present disclosures.

The invention claimed is:

1. A method comprising:
inputting, into a resist deformation model, pattern information relating to a pattern to be formed in a patterning process, the model configured to simulate deformation of a portion of a resist, the portion comprising a boundary liquid layer located at a boundary between a developed or open region in the resist and a region of the resist at least partly surrounding the developed or open region, wherein the model is configured to determine a first deformation component of the boundary liquid layer caused by fluid flow of the boundary liquid layer and a second deformation component of the boundary liquid layer caused by the fluid flow of the boundary liquid layer; and
evaluating, by a hardware processor system, the resist deformation model with the inputted pattern information to determine a deformation of the pattern to be formed in the resist, wherein the deformation comprises a combination of the first deformation component and the second deformation component of the boundary liquid layer.

2. The method of claim 1, wherein the boundary liquid layer has a thickness smaller than a length of the developed or open region in the resist at the boundary.

3. The method of claim 1, wherein the first deformation component is determined in a horizontal plane based on a horizontal component of a flow rate of the boundary liquid layer and the second deformation is determined in the horizontal plane based on a vertical component of the flow rate of the boundary liquid layer.

4. The method of claim 1, wherein the model has defined therein, a boundary condition comprising a velocity gradient approximately equal to zero at a surface of the boundary liquid layer, the surface being opposite of the developed or open region.

5. The method of claim 1, wherein the model has defined therein, a boundary condition comprising a velocity approximately equal to zero at a surface of the boundary liquid layer at the developed or open region.

6. The method of claim 1, wherein the model has defined therein, a velocity as a function of thickness of the boundary liquid layer and a pressure gradient across a thickness of the boundary liquid layer.

7. The method of claim 6, wherein the model has defined therein, the flow rate of the boundary liquid layer as a function of an integration of the velocity over the thickness of the boundary liquid layer.

8. The method of claim 1, wherein the model has defined therein, the deformation as a function of the flow rate of the boundary liquid layer.

9. The method of claim 1, wherein the evaluating comprises:
determination of the first deformation component in a first plane caused by a horizontal component of a flow rate of the boundary liquid layer; and
determination of a final deformation in the first plane by adjusting the first deformation component based on a vertical component of the flow rate of the boundary liquid layer in a second plane, the second plane perpendicular to the first plane.

10. The method of claim 1, wherein the evaluating further comprises:
- definition of a plurality of vertices along a contour of the developed or open region in the resist;
- determination of a capillary force at a given vertex along the contour; and
- redistribution of the vertices such that (i) a volume of the developed or open region in the resist is conserved, and (ii) a volume of the boundary liquid layer is conserved.

11. The method of claim 10, wherein the redistribution of the vertices comprises:
- determination of a time scale based on a horizontal component of a flow rate of the boundary liquid layer; and
- movement, based on the time scale and the flow rate of the boundary layer, the plurality of vertices.

12. The method of claim 10, further comprising:
- determining a rate of change of a thickness of the boundary liquid layer based on the flow rate of the boundary layer; and
- adjusting, based on the redistributed vertices, another plurality of vertices along a surface of the boundary liquid layer based on the rate of change of thickness of the boundary liquid layer.

13. The method of claim 1, wherein the model is a thin-film model simplified based on a lubrication approximation, wherein the lubrication approximation comprises a vertical shear stress value of zero.

14. A non-transitory computer program product comprising machine-readable instructions stored therein, the instructions, when executed by one or more processors, configured to cause the one or more processors to at least perform the method of claim 1.

15. A method comprising:
- inputting, into a resist deformation model, pattern information relating to a pattern to be formed in a patterning process, the model configured to simulate deformation of a portion of a resist, the portion comprising a boundary liquid layer located at a boundary between a developed or open region in the resist and a region of the resist at least partly surrounding the developed or open region, wherein the model is configured to determine a deformation of the boundary liquid layer caused by a horizontal fluid flow of the boundary liquid layer; and
- determining, by a hardware computer system, a deformation of the pattern to be formed in the resist by simulation using the resist deformation model based on the input pattern information.

16. The method of claim 15, wherein the model is further configured to determine a deformation of the boundary liquid layer caused by a vertical fluid flow of the boundary liquid layer.

17. The method of claim 15, wherein the boundary liquid layer has a thickness smaller than a length of the developed or open region in the resist at the boundary.

18. The method of claim 15, wherein the model has defined therein, a boundary condition comprising a velocity gradient approximately equal to zero at a surface of the boundary liquid layer, the surface being opposite of the developed or open region.

19. The method of claim 15, wherein the model has defined therein, a boundary condition comprising a velocity approximately equal to zero at a surface of the boundary liquid layer at the developed or open region.

20. A non-transitory computer program product comprising machine-readable instructions stored therein, the instructions, when executed by one or more processors, configured to cause the one or more processors to at least perform the method of claim 15.

* * * * *